(12) United States Patent
Eichenholz

(10) Patent No.: US 11,428,794 B2
(45) Date of Patent: Aug. 30, 2022

(54) LIDAR SYSTEM WITH HUMIDITY COMPENSATION

(71) Applicant: Luminar, LLC, Orlando, FL (US)

(72) Inventor: Jason M. Eichenholz, Orlando, FL (US)

(73) Assignee: Luminar, LLC, Orlando, FL (US)

( * ) Notice: Subject to any disclaimer, the term of this patent is extended or adjusted under 35 U.S.C. 154(b) by 789 days.

(21) Appl. No.: 16/360,435

(22) Filed: Mar. 21, 2019

(65) Prior Publication Data
US 2020/0300990 A1  Sep. 24, 2020

(51) Int. Cl.
| | | |
|---|---|---|
| *G01S 7/497* | (2006.01) |
| *G01S 7/484* | (2006.01) |
| *G01S 17/08* | (2006.01) |
| *G01S 7/4861* | (2020.01) |
| *G01S 17/931* | (2020.01) |

(52) U.S. Cl.
CPC .............. *G01S 7/497* (2013.01); *G01S 7/484* (2013.01); *G01S 7/4861* (2013.01); *G01S 17/08* (2013.01); *G01S 17/931* (2020.01)

(58) Field of Classification Search
CPC ........ G01S 7/497; G01S 7/484; G01S 7/4861; G01S 17/08; G01S 17/931; G01S 17/42; G01S 7/4865
See application file for complete search history.

(56) References Cited

U.S. PATENT DOCUMENTS

| | | | |
|---|---|---|---|
| 10,222,474 B1 * | 3/2019 | Raring ................ | H01S 5/0087 |
| 10,557,939 B2 * | 2/2020 | Campbell ............. | G01S 17/26 |

* cited by examiner

*Primary Examiner* — Seung C Sohn

(57) ABSTRACT

In one embodiment, a lidar system includes a light source configured to emit an optical signal that is directed into a field of regard (FOR) of the lidar system. The lidar system also includes a receiver configured to: receive a portion of the emitted optical signal scattered by a target located in the FOR a distance from the lidar system; and produce an electrical signal corresponding to the received optical signal, where the electrical signal is related to a preliminary value of an optical characteristic of the received optical signal. The lidar system further includes a processor coupled to the receiver and configured to: determine the distance to the target; receive a humidity value; and determine a corrected value of the optical characteristic of the received optical signal based at least in part on the electrical signal produced by the receiver, the distance to the target, and the humidity value.

32 Claims, 10 Drawing Sheets

LIDAR SYSTEM WITH HUMIDITY COMPENSATION

TECHNICAL FIELD

This disclosure generally relates to lidar systems.

BACKGROUND

Light detection and ranging (lidar) is a technology that can be used to measure distances to remote targets. Typically, a lidar system includes a light source and an optical receiver. The light source can include, for example, a laser which emits light having a particular operating wavelength. The operating wavelength of a lidar system may lie, for example, in the infrared, visible, or ultraviolet portions of the electromagnetic spectrum. The light source emits light toward a target which scatters the light, and some of the scattered light is received back at the receiver. The system determines the distance to the target based on one or more characteristics associated with the received light. For example, the lidar system may determine the distance to the target based on the time of flight for a pulse of light emitted by the light source to travel to the target and back to the lidar system.

DESCRIPTION OF EXAMPLE EMBODIMENTS

Figure 1:
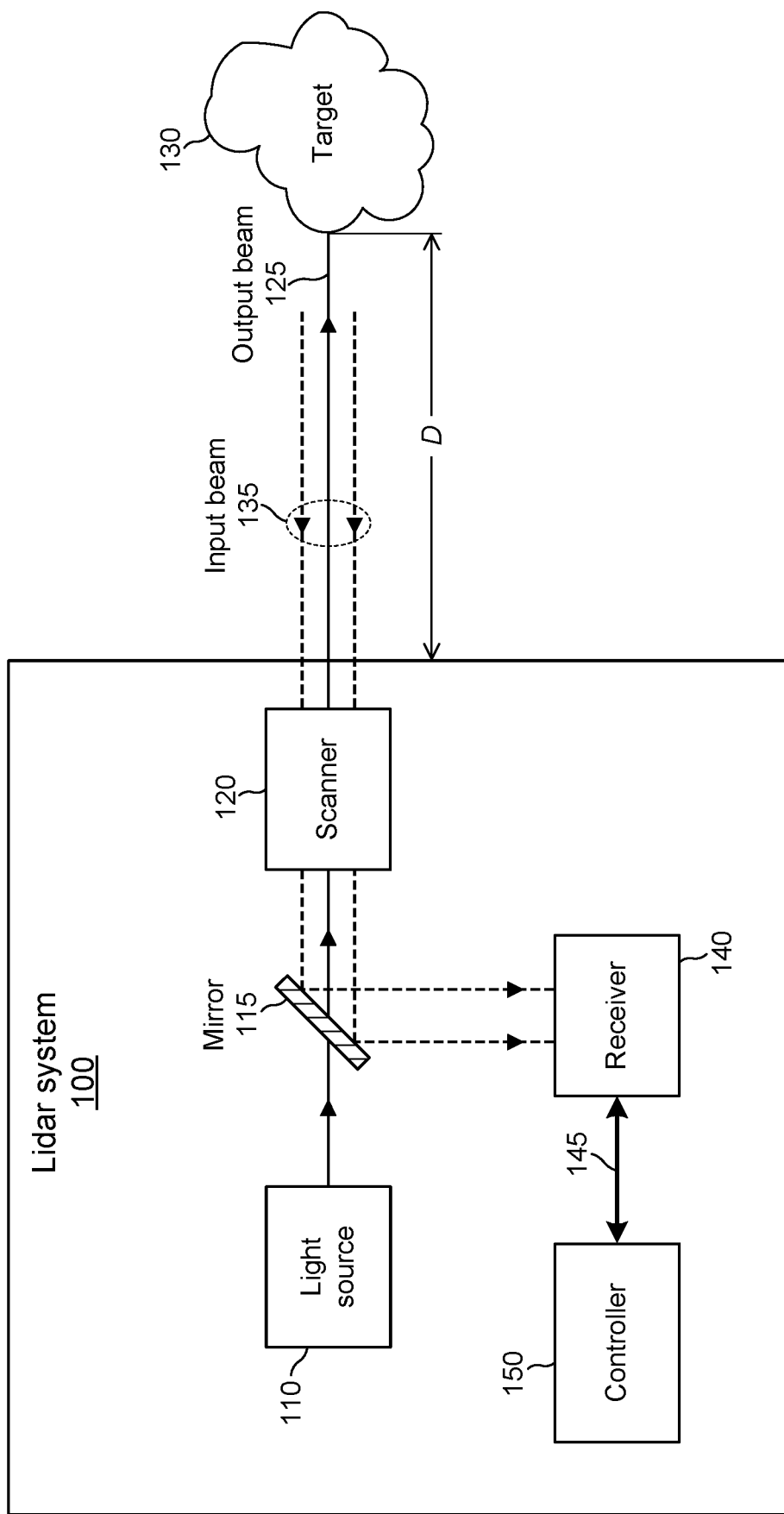
FIG. 1 illustrates an example light detection and ranging (lidar) system.

FIG. 1 illustrates an example light detection and ranging (lidar) system 100. In particular embodiments, a lidar system 100 may be referred to as a laser ranging system, a laser radar system, a LIDAR system, a lidar sensor, or a laser detection and ranging (LADAR or ladar) system. In particular embodiments, a lidar system 100 may include a light source 110, mirror 115, scanner 120, receiver 140, or controller 150. The light source 110 may include, for example, a laser which emits light having a particular operating wavelength in the infrared, visible, or ultraviolet portions of the electromagnetic spectrum. As an example, light source 110 may include a laser with one or more operating wavelengths between approximately 900 nanometers (nm) and 2000 nm. The light source 110 emits an output beam of light 125 which may be continuous wave (CW), pulsed, or modulated in any suitable manner for a given application. The output beam of light 125 is directed downrange toward a remote target 130. As an example, the remote target 130 may be located a distance D of approximately 1 m to 1 km from the lidar system 100.

Once the output beam 125 reaches the downrange target 130, the target may scatter or reflect at least a portion of light from the output beam 125, and some of the scattered or reflected light may return toward the lidar system 100. In the example of FIG. 1, the scattered or reflected light is represented by input beam 135, which passes through scanner 120 and is reflected by mirror 115 and directed to receiver 140. In particular embodiments, a relatively small fraction of the light from output beam 125 may return to the lidar system 100 as input beam 135. As an example, the ratio of input beam 135 average power, peak power, or pulse energy to output beam 125 average power, peak power, or pulse energy may be approximately $10^{-1}$, $10^{-2}$, $10^{-3}$, $10^{-4}$, $10^{-5}$, $10^{-6}$, $10^{-7}$, $10^{-8}$, $10^{-9}$, $10^{-10}$, $10^{-11}$, or $10^{-12}$. As another example, if a pulse of output beam 125 has a pulse energy of 1 microjoule (pJ), then the pulse energy of a corresponding pulse of input beam 135 may have a pulse energy of approximately 10 nanojoules (nJ), 1 nJ, 100 picojoules (pJ), 10 pJ, 1 pJ, 100 femtojoules (fJ), 10 fJ, 1 fJ, 100 attojoules (aJ), 10 aJ, 1 aJ, or 0.1 aJ.

In particular embodiments, output beam 125 may be referred to as an optical signal, laser beam, light beam, optical beam, emitted beam, emitted light, or beam. In particular embodiments, input beam 135 may be referred to as a received optical signal, return beam, received beam, return light, received light, input light, scattered light, or reflected light. As used herein, scattered light may refer to light that is scattered or reflected by a target 130. As an example, an input beam 135 may include: light from the output beam 125 that is scattered by target 130; light from the output beam 125 that is reflected by target 130; or a combination of scattered and reflected light from target 130.

In particular embodiments, receiver 140 may receive or detect photons from input beam 135 and produce one or more representative signals. For example, the receiver 140 may produce an output electrical signal 145 that is representative of the input beam 135, and the electrical signal 145 may be sent to controller 150. In particular embodiments, receiver 140 or controller 150 may include a processor, computing system (e.g., an ASIC or FPGA), or other suitable circuitry. A controller 150 may be configured to analyze one or more characteristics of the electrical signal 145 from the receiver 140 to determine one or more characteristics of the target 130, such as its distance downrange from the lidar system 100. This may be done, for example, by analyzing a time of flight or a frequency or phase of a transmitted beam of light 125 or a received beam of light 135. If lidar system 100 measures a time of flight of T (e.g., T represents a round-trip time of flight for an emitted pulse of light to travel from the lidar system 100 to the target 130 and back to the lidar system 100), then the distance D from the target 130 to the lidar system 100 may be expressed as $D = c \cdot T/2$, where c is the speed of light (approximately $3.0 \times 10^8$ m/s). As an example, if a time of flight is measured to be T=300 ns, then the distance from the target 130 to the lidar system 100 may be determined to be approximately D=45.0 m. As another example, if a time of flight is measured to be T=1.33 μs, then the distance from the target 130 to the lidar system 100 may be determined to be approximately D=199.5 m. In particular embodiments, a distance D from lidar system 100 to a target 130 may be referred to as a distance, depth, or range of target 130. As used herein, the speed of light c refers to the speed of light in any suitable medium, such as for example in air, water, or vacuum. As an example, the speed of light in vacuum is approximately $2.9979 \times 10^8$ m/s, and the speed of light in air (which has a refractive index of approximately 1.0003) is approximately $2.9970 \times 10^8$ m/s.

In particular embodiments, light source 110 may include a pulsed or CW laser. As an example, light source 110 may be a pulsed laser configured to produce or emit pulses of light with a pulse duration or pulse width of approximately 10 picoseconds (ps) to 100 nanoseconds (ns). The pulses may have a pulse duration of approximately 100 ps, 200 ps, 400 ps, 1 ns, 2 ns, 5 ns, 10 ns, 20 ns, 50 ns, 100 ns, or any other suitable pulse duration. As another example, light source 110 may be a pulsed laser that produces pulses with a pulse duration of approximately 1-5 ns. As another example, light source 110 may be a pulsed laser that produces pulses at a pulse repetition frequency of approximately 80 kHz to 10 MHz or a pulse period (e.g., a time between consecutive pulses) of approximately 100 ns to 12.5 μs. In particular embodiments, light source 110 may have a substantially constant pulse repetition frequency, or light source 110 may have a variable or adjustable pulse repetition frequency. As an example, light source 110 may be a pulsed laser that produces pulses at a substantially constant pulse repetition frequency of approximately 640 kHz (e.g., 640,000 pulses per second), corresponding to a pulse period of approximately 1.56 μs. As another example, light source 110 may have a pulse repetition frequency (which may be referred to as a repetition rate) that can be varied from approximately 200 kHz to 2 MHz. As used herein, a pulse of light may be referred to as an optical pulse, a light pulse, or a pulse.

In particular embodiments, light source 110 may include a pulsed or CW laser that produces a free-space output beam 125 having any suitable average optical power. As an example, output beam 125 may have an average power of approximately 1 milliwatt (mW), 10 mW, 100 mW, 1 watt (W), 10 W, or any other suitable average power. In particular embodiments, output beam 125 may include optical pulses with any suitable pulse energy or peak optical power. As an example, output beam 125 may include pulses with a pulse energy of approximately 0.01 μJ, 0.1 μJ, 0.5 μJ, 1 μJ, 2 μJ, 10 μJ, 100 μJ, 1 mJ, or any other suitable pulse energy. As another example, output beam 125 may include pulses with a peak power of approximately 10 W, 100 W, 1 kW, 5 kW, 10 kW, or any other suitable peak power. The peak power ($P_{peak}$) of a pulse of light can be related to the pulse energy (E) by the expression $E = P_{peak} \cdot \Delta t$, where $\Delta t$ is the duration of the pulse, and the duration of a pulse may be defined as the full width at half maximum duration of the pulse. For example, an optical pulse with a duration of 1 ns and a pulse energy of 1 μJ has a peak power of approximately 1 kW. The average power ($P_{av}$) of an output beam 125 can be related to the pulse repetition frequency (PRF) and pulse energy by the expression $P_{av} = PRF \cdot E$. For example, if the pulse repetition frequency is 500 kHz, then the average power of an output beam 125 with 1-μJ pulses is approximately 0.5 W.

In particular embodiments, light source 110 may include a laser diode, such as for example, a Fabry-Perot laser diode, a quantum well laser, a distributed Bragg reflector (DBR) laser, a distributed feedback (DFB) laser, a vertical-cavity surface-emitting laser (VCSEL), a quantum dot laser diode, a grating-coupled surface-emitting laser (GCSEL), a slab-coupled optical waveguide laser (SCOWL), a single-transverse-mode laser diode, a multi-mode broad area laser diode, a laser-diode bar, a laser-diode stack, or a tapered-stripe laser diode. As an example, light source 110 may include an aluminum-gallium-arsenide (AlGaAs) laser diode, an indium-gallium-arsenide (InGaAs) laser diode, an indium-gallium-arsenide-phosphide (InGaAsP) laser diode, or a laser diode that includes any suitable combination of aluminum (Al), indium (In), gallium (Ga), arsenic (As), phosphorous (P), or any other suitable material. In particular embodiments, light source 110 may include a pulsed or CW laser diode with a peak emission wavelength between 1200 nm and 1600 nm. As an example, light source 110 may include a current-modulated InGaAsP DFB laser diode that produces optical pulses at a wavelength of approximately 1550 nm.

In particular embodiments, light source 110 may include a pulsed or CW laser diode followed by one or more optical-amplification stages. For example, a seed laser diode may produce a seed optical signal, and an optical amplifier may amplify the seed optical signal to produce an amplified optical signal that is emitted by the light source 110. In particular embodiments, an optical amplifier may include a fiber-optic amplifier or a semiconductor optical amplifier (SOA). For example, a pulsed laser diode may produce relatively low-power optical seed pulses which are amplified by a fiber-optic amplifier. As another example, a light source 110 may include a fiber-laser module that includes a current-modulated laser diode with an operating wavelength of approximately 1550 nm followed by a single-stage or a multi-stage erbium-doped fiber amplifier (EDFA) or erbium-ytterbium-doped fiber amplifier (EYDFA) that amplifies the seed pulses from the laser diode. As another example, light source 110 may include a continuous-wave (CW) or quasi-CW laser diode followed by an external optical modulator (e.g., an electro-optic amplitude modulator). The optical modulator may modulate the CW light from the laser diode to produce optical pulses which are sent to a fiber-optic amplifier or SOA. As another example, light source 110 may include a pulsed or CW seed laser diode followed by a semiconductor optical amplifier (SOA). The SOA may include an active optical waveguide configured to receive light from the seed laser diode and amplify the light as it propagates through the waveguide. The optical gain of the SOA may be provided by pulsed or direct-current (DC) electrical current supplied to the SOA. The SOA may be integrated on the same chip as the seed laser diode, or the SOA may be a separate device with an anti-reflection coating on its input facet or output facet. As another example, light source 110 may include a seed laser diode followed by a SOA, which in turn is followed by a fiber-optic amplifier. For example, the seed laser diode may produce relatively low-power seed pulses which are amplified by the SOA, and the fiber-optic amplifier may further amplify the optical pulses.

In particular embodiments, light source 110 may include a direct-emitter laser diode. A direct-emitter laser diode (which may be referred to as a direct emitter) may include a laser diode which produces light that is not subsequently amplified by an optical amplifier. A light source 110 that includes a direct-emitter laser diode may not include an optical amplifier, and the output light produced by a direct emitter may not be amplified after it is emitted by the laser diode. The light produced by a direct-emitter laser diode (e.g., optical pulses, CW light, or frequency-modulated light) may be emitted directly as a free-space output beam 125 without being amplified. A direct-emitter laser diode may be driven by an electrical power source that supplies current pulses to the laser diode, and each current pulse may result in the emission of an output optical pulse.

In particular embodiments, light source 110 may include a diode-pumped solid-state (DPSS) laser. A DPSS laser (which may be referred to as a solid-state laser) may refer to a laser that includes a solid-state, glass, ceramic, or crystal-based gain medium that is pumped by one or more pump laser diodes. The gain medium may include a host material that is doped with rare-earth ions (e.g., neodymium, erbium, ytterbium, or praseodymium). For example, a gain medium may include a yttrium aluminum garnet (YAG) crystal that is doped with neodymium (Nd) ions, and the gain medium may be referred to as a Nd:YAG crystal. A DPSS laser with a Nd:YAG gain medium may produce light at a wavelength between approximately 1300 nm and approximately 1400 nm, and the Nd:YAG gain medium may be pumped by one or more pump laser diodes with an operating wavelength between approximately 730 nm and approximately 900 nm. A DPSS laser may be a passively Q-switched laser that includes a saturable absorber (e.g., a vanadium-doped crystal that acts as a saturable absorber). Alternatively, a DPSS laser may be an actively Q-switched laser that includes an active Q-switch (e.g., an acousto-optic modulator or an electro-optic modulator). A passively or actively Q-switched DPSS laser may produce output optical pulses that form an output beam 125 of a lidar system 100.

In particular embodiments, an output beam of light 125 emitted by light source 110 may be a collimated optical beam having any suitable beam divergence, such as for example, a full-angle beam divergence of approximately 0.5 to 10 milliradians (mrad). A divergence of output beam 125 may refer to an angular measure of an increase in beam size (e.g., a beam radius or beam diameter) as output beam 125 travels away from light source 110 or lidar system 100. In particular embodiments, output beam 125 may have a substantially circular cross section with a beam divergence characterized by a single divergence value. As an example, an output beam 125 with a circular cross section and a full-angle beam divergence of 2 mrad may have a beam diameter or spot size of approximately 20 cm at a distance of 100 m from lidar system 100. In particular embodiments, output beam 125 may have a substantially elliptical cross section characterized by two divergence values. As an example, output beam 125 may have a fast axis and a slow axis, where the fast-axis divergence is greater than the slow-axis divergence. As another example, output beam 125 may be an elliptical beam with a fast-axis divergence of 4 mrad and a slow-axis divergence of 2 mrad.

In particular embodiments, an output beam of light 125 emitted by light source 110 may be unpolarized or randomly polarized, may have no specific or fixed polarization (e.g., the polarization may vary with time), or may have a particular polarization (e.g., output beam 125 may be linearly polarized, elliptically polarized, or circularly polarized). As an example, light source 110 may produce light with no specific polarization or may produce light that is linearly polarized.

In particular embodiments, lidar system 100 may include one or more optical components configured to reflect, focus, filter, shape, modify, steer, or direct light within the lidar system 100 or light produced or received by the lidar system 100 (e.g., output beam 125 or input beam 135). As an example, lidar system 100 may include one or more lenses, mirrors, filters (e.g., bandpass or interference filters), beam splitters, polarizers, polarizing beam splitters, wave plates (e.g., half-wave or quarter-wave plates), diffractive elements, holographic elements, isolators, couplers, detectors, beam combiners, or collimators. The optical components in a lidar system 100 may be free-space optical components, fiber-coupled optical components, or a combination of free-space and fiber-coupled optical components.

In particular embodiments, lidar system 100 may include a telescope, one or more lenses, or one or more mirrors configured to expand, focus, or collimate the output beam 125 or the input beam 135 to a desired beam diameter or divergence. As an example, the lidar system 100 may include one or more lenses to focus the input beam 135 onto a photodetector of receiver 140. As another example, the lidar system 100 may include one or more flat mirrors or curved mirrors (e.g., concave, convex, or parabolic mirrors) to steer or focus the output beam 125 or the input beam 135. For example, the lidar system 100 may include an off-axis parabolic mirror to focus the input beam 135 onto a photodetector of receiver 140. As illustrated in FIG. 1, the lidar system 100 may include mirror 115 (which may be a metallic or dielectric mirror), and mirror 115 may be configured so that light beam 125 passes through the mirror 115 or passes along an edge or side of the mirror 115 and input beam 135 is reflected toward the receiver 140. As an example, mirror 115 (which may be referred to as an overlap mirror, superposition mirror, or beam-combiner mirror) may include a hole, slot, or aperture which output light beam 125 passes through. As another example, rather than passing through the mirror 115, the output beam 125 may be directed to pass alongside the mirror 115 with a gap (e.g., a gap of width approximately 0.1 mm, 0.5 mm, 1 mm, 2 mm, 5 mm, or 10 mm) between the output beam 125 and an edge of the mirror 115.

In particular embodiments, mirror 115 may provide for output beam 125 and input beam 135 to be substantially coaxial so that the two beams travel along approximately the same optical path (albeit in opposite directions). The input and output beams being substantially coaxial may refer to the beams being at least partially overlapped or sharing a common propagation axis so that input beam 135 and output beam 125 travel along substantially the same optical path (albeit in opposite directions). As an example, output beam 125 and input beam 135 may be parallel to each other to within less than 10 mrad, 5 mrad, 2 mrad, 1 mrad, 0.5 mrad, or 0.1 mrad. As output beam 125 is scanned across a field of regard, the input beam 135 may follow along with the output beam 125 so that the coaxial relationship between the two beams is maintained.

In particular embodiments, lidar system 100 may include a scanner 120 configured to scan an output beam 125 across a field of regard of the lidar system 100. As an example, scanner 120 may include one or more scanning mirrors configured to pivot, rotate, oscillate, or move in an angular manner about one or more rotation axes. The output beam 125 may be reflected by a scanning mirror, and as the scanning mirror pivots or rotates, the reflected output beam 125 may be scanned in a corresponding angular manner. As an example, a scanning mirror may be configured to periodically pivot back and forth over a 30-degree range, which results in the output beam 125 scanning back and forth across a 60-degree range (e.g., a Θ-degree rotation by a scanning mirror results in a 2Θ-degree angular scan of output beam 125).

In particular embodiments, a scanning mirror may be attached to or mechanically driven by a scanner actuator or mechanism which pivots or rotates the mirror over a particular angular range (e.g., over a 5° angular range, 30° angular range, 60° angular range, 120° angular range, 360° angular range, or any other suitable angular range). A scanner actuator or mechanism configured to pivot or rotate a mirror may include a galvanometer scanner, a resonant scanner, a piezoelectric actuator, a voice coil motor, an electric motor (e.g., a DC motor, a brushless DC motor, a synchronous electric motor, or a stepper motor), a microelectromechanical systems (MEMS) device, or any other suitable actuator or mechanism. As an example, a scanner 120 may include a scanning mirror attached to a galvanometer scanner configured to pivot back and forth over a 1° to 30° angular range. As another example, a scanner 120 may include a scanning mirror that is attached to or is part of a MEMS device configured to scan over a 1° to 30° angular range. As another example, a scanner 120 may include a polygon mirror configured to rotate continuously in the same direction (e.g., rather than pivoting back and forth, the polygon mirror continuously rotates 360 degrees in a clockwise or counterclockwise direction). The polygon mirror may be coupled or attached to a synchronous motor configured to rotate the polygon mirror at a substantially fixed rotational frequency (e.g., a rotational frequency of approximately 1 Hz, 10 Hz, 50 Hz, 100 Hz, 500 Hz, or 1,000 Hz).

In particular embodiments, scanner 120 may be configured to scan the output beam 125 (which may include at least a portion of the light emitted by light source 110) across a field of regard of the lidar system 100. A field of regard (FOR) of a lidar system 100 may refer to an area, region, or angular range over which the lidar system 100 may be configured to scan or capture distance information. As an example, a lidar system 100 with an output beam 125 with a 30-degree scanning range may be referred to as having a 30-degree angular field of regard. As another example, a lidar system 100 with a scanning mirror that rotates over a 30-degree range may produce an output beam 125 that scans across a 60-degree range (e.g., a 60-degree FOR). In particular embodiments, lidar system 100 may have a FOR of approximately 10°, 20°, 40°, 60°, 120°, 360°, or any other suitable FOR.

In particular embodiments, scanner 120 may be configured to scan the output beam 125 horizontally and vertically, and lidar system 100 may have a particular FOR along the horizontal direction and another particular FOR along the vertical direction. As an example, lidar system 100 may have a horizontal FOR of 10° to 120° and a vertical FOR of 2° to 45°. In particular embodiments, scanner 120 may include a first scan mirror and a second scan mirror, where the first scan mirror directs the output beam 125 toward the second scan mirror, and the second scan mirror directs the output beam 125 downrange from the lidar system 100. As an example, the first scan mirror may scan the output beam 125 along a first direction, and the second scan mirror may scan the output beam 125 along a second direction that is substantially orthogonal to the first direction. As another example, the first scan mirror may scan the output beam 125 along a substantially horizontal direction, and the second scan mirror may scan the output beam 125 along a substantially vertical direction (or vice versa). As another example, the first and second scan mirrors may each be driven by galvanometer scanners. As another example, the first or second scan mirror may include a polygon mirror driven by an electric motor. In particular embodiments, scanner 120 may be referred to as a beam scanner, optical scanner, or laser scanner.

In particular embodiments, one or more scanning mirrors may be communicatively coupled to controller 150 which may control the scanning mirror(s) so as to guide the output beam 125 in a desired direction downrange or along a desired scan pattern. In particular embodiments, a scan pattern may refer to a pattern or path along which the output beam 125 is directed. As an example, scanner 120 may include two scanning mirrors configured to scan the output beam 125 across a 60° horizontal FOR and a 20° vertical FOR. The two scanner mirrors may be controlled to follow a scan path that substantially covers the 60°×20° FOR. As an example, the scan path may result in a point cloud with pixels that substantially cover the 60°×20° FOR. The pixels may be approximately evenly distributed across the 60°×20° FOR. Alternatively, the pixels may have a particular non-uniform distribution (e.g., the pixels may be distributed across all or a portion of the 60°×20° FOR, and the pixels may have a higher density in one or more particular regions of the 60°×20° FOR).

In particular embodiments, a lidar system 100 may include a scanner 120 with a solid-state scanning device. A solid-state scanning device may refer to a scanner 120 that scans an output beam 125 without the use of moving parts (e.g., without the use of a mechanical scanner, such as a mirror that rotates or pivots). For example, a solid-state scanner 120 may include one or more of the following: an optical phased array scanning device; a liquid-crystal scanning device; or a liquid lens scanning device. A solid-state scanner 120 may be an electrically addressable device that scans an output beam 125 along one axis (e.g., horizontally) or along two axes (e.g., horizontally and vertically). In particular embodiments, a scanner 120 may include a solid-state scanner and a mechanical scanner. For example, a scanner 120 may include an optical phased array scanner configured to scan an output beam 125 in one direction and a galvanometer scanner that scans the output beam 125 in an orthogonal direction. The optical phased array scanner may scan the output beam relatively rapidly in a horizontal direction across the field of regard (e.g., at a scan rate of 50 to 1,000 scan lines per second), and the galvanometer may pivot a mirror at a rate of 1-30 Hz to scan the output beam 125 vertically.

In particular embodiments, a lidar system 100 may include a light source 110 configured to emit pulses of light and a scanner 120 configured to scan at least a portion of the emitted pulses of light across a field of regard of the lidar system 100. One or more of the emitted pulses of light may be scattered by a target 130 located downrange from the lidar system 100, and a receiver 140 may detect at least a portion of the pulses of light scattered by the target 130. A receiver 140 may be referred to as a photoreceiver, optical receiver, optical sensor, detector, photodetector, or optical detector. In particular embodiments, lidar system 100 may include a receiver 140 that receives or detects at least a portion of input beam 135 and produces an electrical signal that corresponds to input beam 135. As an example, if input beam 135 includes an optical pulse, then receiver 140 may produce an electrical current or voltage pulse that corresponds to the optical pulse detected by receiver 140. As another example, receiver 140 may include one or more avalanche photodiodes (APDs) or one or more single-photon avalanche diodes (SPADs). As another example, receiver 140 may include one or more PN photodiodes (e.g., a photodiode structure formed by a p-type semiconductor and a n-type semiconductor, where the PN acronym refers to the structure having p-doped and n-doped regions) or one or more PIN photodiodes (e.g., a photodiode structure formed by an undoped intrinsic semiconductor region located between p-type and n-type regions, where the PIN acronym refers to the structure having p-doped, intrinsic, and n-doped regions). An APD, SPAD, PN photodiode, or PIN photodiode may each be referred to as a detector, photodetector, or photodiode. A detector may have an active region or an avalanche-multiplication region that includes silicon, germanium, InGaAs, or AlInAsSb (aluminum indium arsenide antimonide). The active region may refer to an area over which a detector may receive or detect input light. An active region may have any suitable size or diameter, such as for example, a diameter of approximately 10 µm, 25 µm, 50 µm, 80 µm, 100 µm, 200 µm, 500 µm, 1 mm, 2 mm, or 5 mm.

In particular embodiments, receiver 140 may include electronic circuitry that performs signal amplification, sampling, filtering, signal conditioning, analog-to-digital conversion, time-to-digital conversion, pulse detection, threshold detection, rising-edge detection, or falling-edge detection. As an example, receiver 140 may include a transimpedance amplifier that converts a received photocurrent (e.g., a current produced by an APD in response to a received optical signal) into a voltage signal. The voltage signal may be sent to pulse-detection circuitry that produces an analog or digital output signal 145 that corresponds to one or more optical characteristics (e.g., rising edge, falling edge, amplitude, duration, or energy) of a received optical pulse. As an example, the pulse-detection circuitry may perform a time-to-digital conversion to produce a digital output signal 145. The electrical output signal 145 may be sent to controller 150 for processing or analysis (e.g., to determine a time-of-flight value corresponding to a received optical pulse).

In particular embodiments, controller 150 may be electrically coupled or communicatively coupled to light source 110, scanner 120, or receiver 140. As an example, controller 150 may receive electrical trigger pulses or edges from light source 110, where each pulse or edge corresponds to the emission of an optical pulse by light source 110. As another example, controller 150 may provide instructions, a control signal, or a trigger signal to light source 110 indicating when light source 110 should produce optical pulses. Controller 150 may send an electrical trigger signal that includes electrical pulses, where each electrical pulse results in the emission of an optical pulse by light source 110. In particular embodiments, the frequency, period, duration, pulse energy, peak power, average power, or wavelength of the optical pulses produced by light source 110 may be adjusted based on instructions, a control signal, or trigger pulses provided by controller 150. In particular embodiments, controller 150 may be coupled to light source 110 and receiver 140, and controller 150 may determine a time-of-flight value for an optical pulse based on timing information associated with when the pulse was emitted by light source 110 and when a portion of the pulse (e.g., input beam 135) was detected or received by receiver 140. In particular embodiments, controller 150 may include circuitry that performs signal amplification, sampling, filtering, signal conditioning, analog-to-digital conversion, time-to-digital conversion, pulse detection, threshold detection, rising-edge detection, or falling-edge detection.

In particular embodiments, lidar system 100 may include one or more processors (e.g., a controller 150) configured to determine a distance D from the lidar system 100 to a target 130 based at least in part on a round-trip time of flight for an emitted pulse of light to travel from the lidar system 100 to the target 130 and back to the lidar system 100. The target 130 may be at least partially contained within a field of regard of the lidar system 100 and located a distance D from the lidar system 100 that is less than or equal to an operating range ($R_{OP}$) of the lidar system 100. In particular embodiments, an operating range (which may be referred to as an operating distance) of a lidar system 100 may refer to a distance over which the lidar system 100 is configured to sense or identify targets 130 located within a field of regard of the lidar system 100. The operating range of lidar system 100 may be any suitable distance, such as for example, 25 m, 50 m, 100 m, 200 m, 500 m, or 1 km. As an example, a lidar system 100 with a 200-m operating range may be configured to sense or identify various targets 130 located up to 200 m away from the lidar system 100. The operating range $R_{OP}$ of a lidar system 100 may be related to the time τ between the emission of successive optical signals by the expression $R_{OP}=c·τ/2$. For a lidar system 100 with a 200-m operating range ($R_{OP}=200$ m), the time τ between successive pulses (which may be referred to as the pulse period) is approximately $2·R_{OP}/c≅1.33$ µs. The pulse period τ may also correspond to the time of flight for a pulse to travel to and from a target 130 located a distance $R_{OP}$ from the lidar system 100. Additionally, the pulse period τ may be related to the pulse repetition frequency (PRF) by the expression τ=1/PRF. For example, a pulse period of 1.33 µs corresponds to a PRF of approximately 752 kHz.

In particular embodiments, a lidar system 100 may be used to determine the distance to one or more downrange targets 130. By scanning the lidar system 100 across a field of regard, the system may be used to map the distance to a number of points within the field of regard. Each of these depth-mapped points may be referred to as a pixel or a voxel. A collection of pixels captured in succession (which may be referred to as a depth map, a point cloud, or a frame) may be rendered as an image or may be analyzed to identify or detect objects or to determine a shape or distance of objects within the FOR. As an example, a point cloud may cover a field of regard that extends 60° horizontally and 15° vertically, and the point cloud may include a frame of 100-2000 pixels in the horizontal direction by 4-400 pixels in the vertical direction.

In particular embodiments, lidar system 100 may be configured to repeatedly capture or generate point clouds of a field of regard at any suitable frame rate between approximately 0.1 frames per second (FPS) and approximately 1,000 FPS. As an example, lidar system 100 may generate point clouds at a frame rate of approximately 0.1 FPS, 0.5 FPS, 1 FPS, 2 FPS, 5 FPS, 10 FPS, 20 FPS, 100 FPS, 500 FPS, or 1,000 FPS. As another example, lidar system 100 may be configured to produce optical pulses at a rate of $5×10^5$ pulses/second (e.g., the system may determine 500,000 pixel distances per second) and scan a frame of 1000×50 pixels (e.g., 50,000 pixels/frame), which corresponds to a point-cloud frame rate of 10 frames per second (e.g., 10 point clouds per second). In particular embodiments, a point-cloud frame rate may be substantially fixed, or a point-cloud frame rate may be dynamically adjustable. As an example, a lidar system 100 may capture one or more point clouds at a particular frame rate (e.g., 1 Hz) and then switch to capture one or more point clouds at a different frame rate (e.g., 10 Hz). A slower frame rate (e.g., 1 Hz) may be used to capture one or more high-resolution point clouds, and a faster frame rate (e.g., 10 Hz) may be used to rapidly capture multiple lower-resolution point clouds.

In particular embodiments, a lidar system 100 may be configured to sense, identify, or determine distances to one or more targets 130 within a field of regard. As an example, a lidar system 100 may determine a distance to a target 130, where all or part of the target 130 is contained within a field of regard of the lidar system 100. All or part of a target 130 being contained within a FOR of the lidar system 100 may refer to the FOR overlapping, encompassing, or enclosing at least a portion of the target 130. In particular embodiments, target 130 may include all or part of an object that is moving or stationary relative to lidar system 100. As an example, target 130 may include all or a portion of a person, vehicle, motorcycle, truck, train, bicycle, wheelchair, pedestrian, animal, road sign, traffic light, lane marking, road-surface marking, parking space, pylon, guard rail, traffic barrier, pothole, railroad crossing, obstacle in or near a road, curb, stopped vehicle on or beside a road, utility pole, house, building, trash can, mailbox, tree, any other suitable object, or any suitable combination of all or part of two or more objects. In particular embodiments, a target may be referred to as an object.

In particular embodiments, light source 110, scanner 120, and receiver 140 may be packaged together within a single housing, where a housing may refer to a box, case, or enclosure that holds or contains all or part of a lidar system 100. As an example, a lidar-system enclosure may contain a light source 110, mirror 115, scanner 120, and receiver 140 of a lidar system 100. Additionally, the lidar-system enclosure may include a controller 150. The lidar-system enclosure may also include one or more electrical connections for conveying electrical power or electrical signals to or from the enclosure. In particular embodiments, one or more components of a lidar system 100 may be located remotely from a lidar-system enclosure. As an example, all or part of light source 110 may be located remotely from a lidar-system enclosure, and pulses of light produced by the light source 110 may be conveyed to the enclosure via optical fiber. As another example, all or part of a controller 150 may be located remotely from a lidar-system enclosure.

In particular embodiments, light source 110 may include an eye-safe laser, or lidar system 100 may be classified as an eye-safe laser system or laser product. An eye-safe laser, laser system, or laser product may refer to a system that includes a laser with an emission wavelength, average power, peak power, peak intensity, pulse energy, beam size, beam divergence, exposure time, or scanned output beam such that emitted light from the system presents little or no possibility of causing damage to a person's eyes. As an example, light source 110 or lidar system 100 may be classified as a Class 1 laser product (as specified by the 60825-1 standard of the International Electrotechnical Commission (IEC)) or a Class I laser product (as specified by Title 21, Section 1040.10 of the United States Code of Federal Regulations (CFR)) that is safe under all conditions of normal use. In particular embodiments, lidar system 100 may be an eye-safe laser product (e.g., with a Class 1 or Class I classification) configured to operate at any suitable wavelength between approximately 900 nm and approximately 2100 nm. As an example, lidar system 100 may include a laser with an operating wavelength between approximately 1200 nm and approximately 1400 nm or between approximately 1400 nm and approximately 1600 nm, and the laser or the lidar system 100 may be operated in an eye-safe manner. As another example, lidar system 100 may be an eye-safe laser product that includes a scanned laser with an operating wavelength between approximately 900 nm and approximately 1700 nm. As another example, lidar system 100 may be a Class 1 or Class I laser product that includes a laser diode, fiber laser, or solid-state laser with an operating wavelength between approximately 1200 nm and approximately 1600 nm.

In particular embodiments, one or more lidar systems 100 may be integrated into a vehicle. As an example, multiple lidar systems 100 may be integrated into a car to provide a complete 360-degree horizontal FOR around the car. As another example, 2-10 lidar systems 100, each system having a 45-degree to 180-degree horizontal FOR, may be combined together to form a sensing system that provides a point cloud covering a 360-degree horizontal FOR. The lidar systems 100 may be oriented so that adjacent FORs have an amount of spatial or angular overlap to allow data from the multiple lidar systems 100 to be combined or stitched together to form a single or continuous 360-degree point cloud. As an example, the FOR of each lidar system 100 may have approximately 1-30 degrees of overlap with an adjacent FOR. In particular embodiments, a vehicle may refer to a mobile machine configured to transport people or cargo. For example, a vehicle may include, may take the form of, or may be referred to as a car, automobile, motor vehicle, truck, bus, van, trailer, off-road vehicle, farm vehicle, lawn mower, construction equipment, forklift, robot, golf cart, motorhome, taxi, motorcycle, scooter, bicycle, skateboard, train, snowmobile, watercraft (e.g., a ship or boat), aircraft (e.g., a fixed-wing aircraft, helicopter, or dirigible), unmanned aerial vehicle (e.g., drone), or spacecraft. In particular embodiments, a vehicle may include an internal combustion engine or an electric motor that provides propulsion for the vehicle.

In particular embodiments, one or more lidar systems 100 may be included in a vehicle as part of an advanced driver assistance system (ADAS) to assist a driver of the vehicle in operating the vehicle. For example, a lidar system 100 may be part of an ADAS that provides information or feedback to a driver (e.g., to alert the driver to potential problems or hazards) or that automatically takes control of part of a vehicle (e.g., a braking system or a steering system) to avoid collisions or accidents. A lidar system 100 may be part of a vehicle ADAS that provides adaptive cruise control, automated braking, automated parking, collision avoidance, alerts the driver to hazards or other vehicles, maintains the vehicle in the correct lane, or provides a warning if an object or another vehicle is in a blind spot.

In particular embodiments, one or more lidar systems 100 may be integrated into a vehicle as part of an autonomous-vehicle driving system. As an example, a lidar system 100 may provide information about the surrounding environment to a driving system of an autonomous vehicle. An autonomous-vehicle driving system may be configured to guide the autonomous vehicle through an environment surrounding the vehicle and toward a destination. An autonomous-vehicle driving system may include one or more computing systems that receive information from a lidar system 100 about the surrounding environment, analyze the received information, and provide control signals to the vehicle's driving systems (e.g., steering wheel, accelerator, brake, or turn signal). As an example, a lidar system 100 integrated into an autonomous vehicle may provide an autonomous-vehicle driving system with a point cloud every 0.1 seconds (e.g., the point cloud has a 10 Hz update rate, representing 10 frames per second). The autonomous-vehicle driving system may analyze the received point clouds to sense or identify targets 130 and their respective locations, distances, or speeds, and the autonomous-vehicle driving system may update control signals based on this information. As an example, if lidar system 100 detects a vehicle ahead that is slowing down or stopping, the autonomous-vehicle driving system may send instructions to release the accelerator and apply the brakes.

In particular embodiments, an autonomous vehicle may be referred to as an autonomous car, driverless car, self-driving car, robotic car, or unmanned vehicle. In particular embodiments, an autonomous vehicle may refer to a vehicle configured to sense its environment and navigate or drive with little or no human input. As an example, an autonomous vehicle may be configured to drive to any suitable location and control or perform all safety-critical functions (e.g., driving, steering, braking, parking) for the entire trip, with the driver not expected to control the vehicle at any time. As another example, an autonomous vehicle may allow a driver to safely turn their attention away from driving tasks in particular environments (e.g., on freeways), or an autonomous vehicle may provide control of a vehicle in all but a few environments, requiring little or no input or attention from the driver.

In particular embodiments, an autonomous vehicle may be configured to drive with a driver present in the vehicle, or an autonomous vehicle may be configured to operate the vehicle with no driver present. As an example, an autonomous vehicle may include a driver's seat with associated controls (e.g., steering wheel, accelerator pedal, and brake pedal), and the vehicle may be configured to drive with no one seated in the driver's seat or with little or no input from a person seated in the driver's seat. As another example, an autonomous vehicle may not include any driver's seat or associated driver's controls, and the vehicle may perform substantially all driving functions (e.g., driving, steering, braking, parking, and navigating) without human input. As another example, an autonomous vehicle may be configured to operate without a driver (e.g., the vehicle may be configured to transport human passengers or cargo without a driver present in the vehicle). As another example, an autonomous vehicle may be configured to operate without any human passengers (e.g., the vehicle may be configured for transportation of cargo without having any human passengers onboard the vehicle).

In particular embodiments, an optical signal (which may be referred to as a light signal, a light waveform, an optical waveform, an output beam, or emitted light) may include pulses of light, CW light, amplitude-modulated light, frequency-modulated light, or any suitable combination thereof. Although this disclosure describes or illustrates example embodiments of lidar systems 100 or light sources 110 that produce optical signals that include pulses of light, the embodiments described or illustrated herein may also be applied, where appropriate, to other types of optical signals, including continuous-wave (CW) light, amplitude-modulated optical signals, or frequency-modulated optical signals. For example, a lidar system 100 as described or illustrated herein may include a light source 110 configured to produce pulses of light. Alternatively, a lidar system 100 may be configured to operate as a frequency-modulated continuous-wave (FMCW) lidar system and may include a light source 110 configured to produce CW light or a frequency-modulated optical signal.

In particular embodiments, a lidar system 100 may be a FMCW lidar system where the emitted light from the light source 110 (e.g., output beam 125 in FIG. 1 or FIG. 3) includes frequency-modulated light. A pulsed lidar system is a type of lidar system 100 in which the light source 110 emits pulses of light, and the distance to a remote target 130 is determined from the time-of-flight for a pulse of light to travel to the target 130 and back. Another type of lidar system 100 is a frequency-modulated lidar system, which may be referred to as a frequency-modulated continuous-wave (FMCW) lidar system. A FMCW lidar system uses frequency-modulated light to determine the distance to a remote target 130 based on a modulation frequency of the received light (which is scattered by the remote target) relative to the modulation frequency of the emitted light. A round-trip time for the emitted light to travel to a target 130 and back to the lidar system may correspond to a frequency difference between the received scattered light and a portion of the emitted light.

For example, for a linearly chirped light source (e.g., a frequency modulation that produces a linear change in frequency with time), the larger the frequency difference between the emitted light and the received light, the farther away the target 130 is located. The frequency difference may be determined by mixing the received light with a portion of the emitted light (e.g., by coupling the two beams onto a detector, or by mixing analog electric signals corresponding to the received light and the emitted light) and determining the resulting beat frequency. For example, an electrical signal from an APD may be analyzed using a fast Fourier transform (FFT) technique to determine the frequency difference between the emitted light and the received light. If a linear frequency modulation m (e.g., in units of Hz/s) is applied to a CW laser, then the round-trip time T may be related to the frequency difference between the received scattered light and the emitted light $\Delta f$ by the expression $T = \Delta f/m$. Additionally, the distance D from the target 130 to the lidar system 100 may be expressed as $D = c \cdot \Delta f/(2 m)$, where c is the speed of light. For example, for a light source 110 with a linear frequency modulation of $10^{12}$ Hz/s (or, 1 MHz/μs), if a frequency difference (between the received scattered light and the emitted light) of 330 kHz is measured, then the distance to the target is approximately 50 meters (which corresponds to a round-trip time of approximately 330 ns). As another example, a frequency difference of 1.33 MHz corresponds to a target located approximately 200 meters away.

The light source 110 for a FMCW lidar system may be a fiber laser (e.g., a seed laser diode followed by one or more optical amplifiers) or a direct-emitter laser diode. The seed laser diode or the direct-emitter laser diode may be operated in a CW manner (e.g., by driving the laser diode with a substantially constant DC current), and the frequency modulation may be provided by an external modulator (e.g., an electro-optic phase modulator). Alternatively, the frequency modulation may be produced by applying a DC bias current along with a current modulation to the seed laser diode or the direct-emitter laser diode. The current modulation produces a corresponding refractive-index modulation in the laser diode, which results in a frequency modulation of the light emitted by the laser diode. The current-modulation component (and corresponding frequency modulation) may have any suitable frequency or shape (e.g., piecewise linear, sinusoidal, triangle-wave, or sawtooth).

Figure 2:
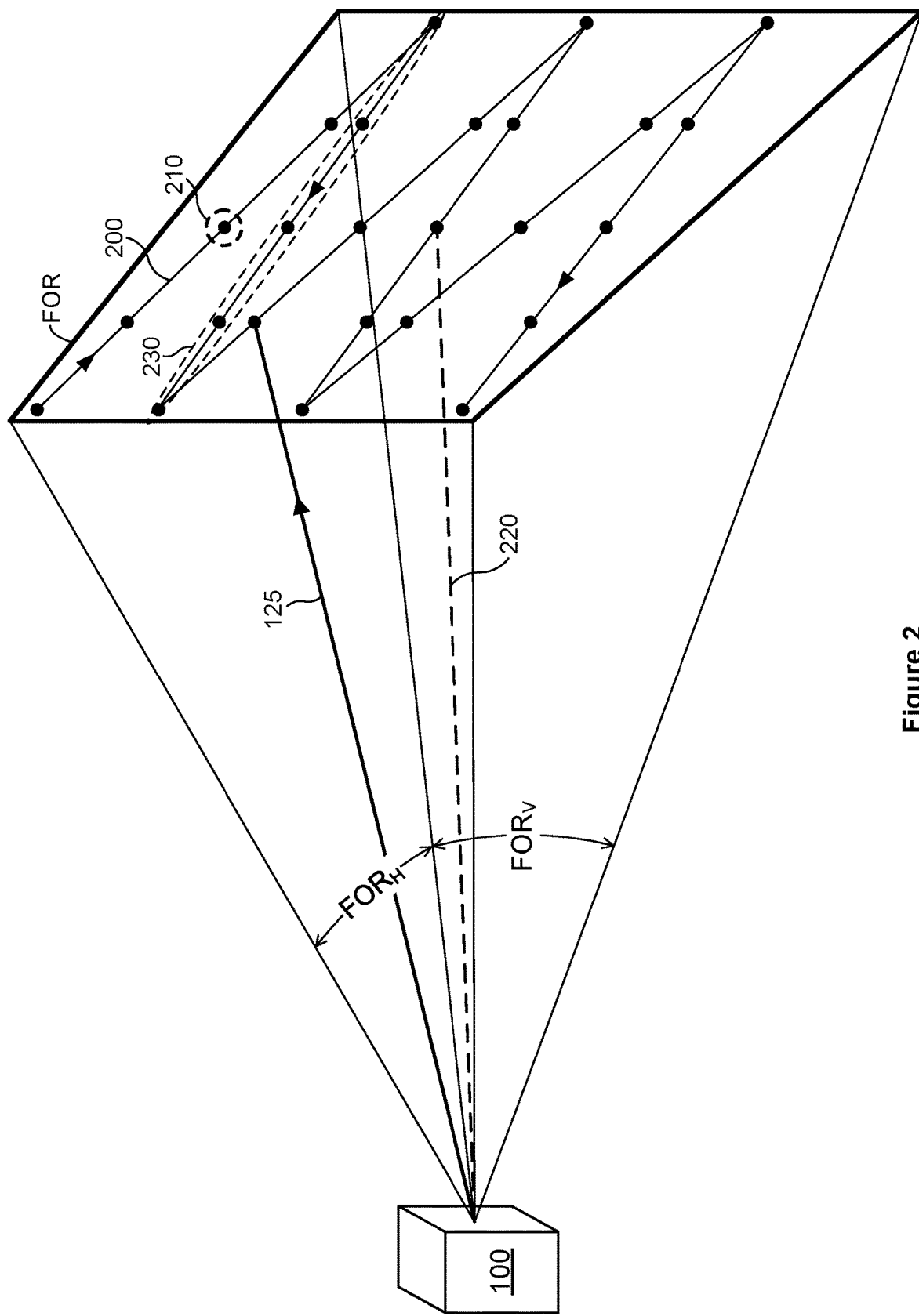
FIG. 2 illustrates an example scan pattern produced by a lidar system.

FIG. 2 illustrates an example scan pattern 200 produced by a lidar system 100. A scan pattern 200 (which may be referred to as an optical scan pattern, optical scan path, scan path, or scan) may represent a path or course followed by output beam 125 as it is scanned across all or part of a FOR. Each traversal of a scan pattern 200 may correspond to the capture of a single frame or a single point cloud. In particular embodiments, a lidar system 100 may be configured to scan output optical beam 125 along one or more particular scan patterns 200. In particular embodiments, a scan pattern 200 may scan across any suitable field of regard (FOR) having any suitable horizontal FOR ($FOR_H$) and any suitable vertical FOR ($FOR_V$). For example, a scan pattern 200 may have a field of regard represented by angular dimensions (e.g., $FOR_H \times FOR_V$) 40°×30°, 90°×40°, or 60°×15°. As another example, a scan pattern 200 may have a $FOR_H$ greater than or equal to 10°, 25°, 30°, 40°, 60°, 90°, or 120°.

As another example, a scan pattern 200 may have a FOR$_V$ greater than or equal to 2°, 5°, 10°, 15°, 20°, 30°, or 45°.

In the example of FIG. 2, reference line 220 represents a center of the field of regard of scan pattern 200. In particular embodiments, reference line 220 may have any suitable orientation, such as for example, a horizontal angle of 0° (e.g., reference line 220 may be oriented straight ahead) and a vertical angle of 0° (e.g., reference line 220 may have an inclination of 0°), or reference line 220 may have a nonzero horizontal angle or a nonzero inclination (e.g., a vertical angle of +10° or −10°). In FIG. 2, if the scan pattern 200 has a 60°×15° field of regard, then scan pattern 200 covers a ±30° horizontal range with respect to reference line 220 and a ±7.5° vertical range with respect to reference line 220. Additionally, optical beam 125 in FIG. 2 has an orientation of approximately −15° horizontal and +3° vertical with respect to reference line 220. Optical beam 125 may be referred to as having an azimuth of −15° and an altitude of +3° relative to reference line 220. In particular embodiments, an azimuth (which may be referred to as an azimuth angle) may represent a horizontal angle with respect to reference line 220, and an altitude (which may be referred to as an altitude angle, elevation, or elevation angle) may represent a vertical angle with respect to reference line 220.

In particular embodiments, a scan pattern 200 may include multiple pixels 210, and each pixel 210 may be associated with one or more laser pulses or one or more distance measurements. Additionally, a scan pattern 200 may include multiple scan lines 230, where each scan line represents one scan across at least part of a field of regard, and each scan line 230 may include multiple pixels 210. In FIG. 2, scan line 230 includes five pixels 210 and corresponds to an approximately horizontal scan across the FOR from right to left, as viewed from the lidar system 100. In particular embodiments, a cycle of scan pattern 200 may include a total of $P_x \times P_y$ pixels 210 (e.g., a two-dimensional distribution of $P_x$ by $P_y$ pixels). As an example, scan pattern 200 may include a distribution with dimensions of approximately 100-2,000 pixels 210 along a horizontal direction and approximately 4-400 pixels 210 along a vertical direction. As another example, scan pattern 200 may include a distribution of 1,000 pixels 210 along the horizontal direction by 64 pixels 210 along the vertical direction (e.g., the frame size is 1000×64 pixels) for a total of 64,000 pixels per cycle of scan pattern 200. In particular embodiments, the number of pixels 210 along a horizontal direction may be referred to as a horizontal resolution of scan pattern 200, and the number of pixels 210 along a vertical direction may be referred to as a vertical resolution. As an example, scan pattern 200 may have a horizontal resolution of greater than or equal to 100 pixels 210 and a vertical resolution of greater than or equal to 4 pixels 210. As another example, scan pattern 200 may have a horizontal resolution of 100-2,000 pixels 210 and a vertical resolution of 4-400 pixels 210.

In particular embodiments, each pixel 210 may be associated with a distance (e.g., a distance to a portion of a target 130 from which an associated laser pulse was scattered) or one or more angular values. As an example, a pixel 210 may be associated with a distance value and two angular values (e.g., an azimuth and altitude) that represent the angular location of the pixel 210 with respect to the lidar system 100. A distance to a portion of target 130 may be determined based at least in part on a time-of-flight measurement for a corresponding pulse. An angular value (e.g., an azimuth or altitude) may correspond to an angle (e.g., relative to reference line 220) of output beam 125 (e.g., when a corresponding pulse is emitted from lidar system 100) or an angle of input beam 135 (e.g., when an input signal is received by lidar system 100). In particular embodiments, an angular value may be determined based at least in part on a position of a component of scanner 120. As an example, an azimuth or altitude value associated with a pixel 210 may be determined from an angular position of one or more corresponding scanning mirrors of scanner 120.

Figure 3:
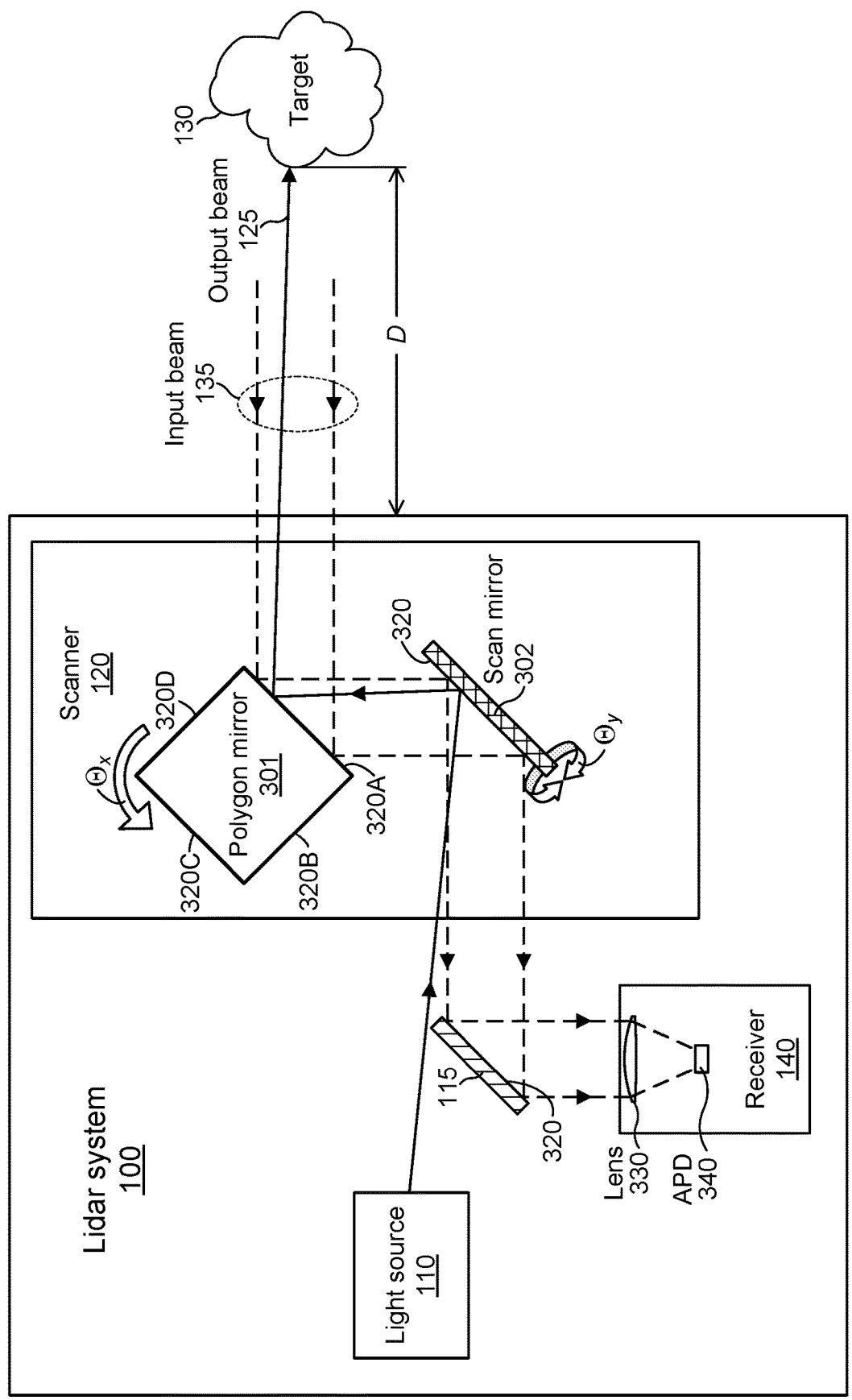
FIG. 3 illustrates an example lidar system with an example rotating polygon mirror.

FIG. 3 illustrates an example lidar system 100 with an example rotating polygon mirror 301. In particular embodiments, a scanner 120 may include a polygon mirror 301 configured to scan output beam 125 along a particular direction. In the example of FIG. 3, scanner 120 includes two scanning mirrors: (1) a polygon mirror 301 that rotates along the $\Theta_x$ direction and (2) a scanning mirror 302 that oscillates back and forth along the $\Theta_y$ direction. The output beam 125 from light source 110, which passes alongside mirror 115, is reflected by reflecting surface 320 of scan mirror 302 and is then reflected by a reflecting surface (e.g., surface 320A, 320B, 320C, or 320D) of polygon mirror 301. Scattered light from a target 130 returns to the lidar system 100 as input beam 135. The input beam 135 reflects from polygon mirror 301, scan mirror 302, and mirror 115, which directs input beam 135 through focusing lens 330 and to the detector 340 of receiver 140. The detector 340 may be a PN photodiode, a PIN photodiode, an APD, a SPAD, or any other suitable detector. A reflecting surface 320 (which may be referred to as a reflective surface) may include a reflective metallic coating (e.g., gold, silver, or aluminum) or a reflective dielectric coating, and the reflecting surface 320 may have any suitable reflectivity R at an operating wavelength of the light source 110 (e.g., R greater than or equal to 70%, 80%, 90%, 95%, 98%, or 99%).

In particular embodiments, a polygon mirror 301 may be configured to rotate along a $\Theta_x$ or $\Theta_y$ direction and scan output beam 125 along a substantially horizontal or vertical direction, respectively. A rotation along a Ox direction may refer to a rotational motion of mirror 301 that results in output beam 125 scanning along a substantially horizontal direction. Similarly, a rotation along a $\Theta_y$ direction may refer to a rotational motion that results in output beam 125 scanning along a substantially vertical direction. In FIG. 3, mirror 301 is a polygon mirror that rotates along the $\Theta_x$ direction and scans output beam 125 along a substantially horizontal direction, and mirror 302 pivots along the $\Theta_y$ direction and scans output beam 125 along a substantially vertical direction. In particular embodiments, a polygon mirror 301 may be configured to scan output beam 125 along any suitable direction. As an example, a polygon mirror 301 may scan output beam 125 at any suitable angle with respect to a horizontal or vertical direction, such as for example, at an angle of approximately 0°, 10°, 20°, 30°, 45°, 60°, 70°, 80°, or 90° with respect to a horizontal or vertical direction.

In particular embodiments, a polygon mirror 301 may refer to a multi-sided object having reflective surfaces 320 on two or more of its sides or faces. As an example, a polygon mirror may include any suitable number of reflective faces (e.g., 2, 3, 4, 5, 6, 7, 8, or 10 faces), where each face includes a reflective surface 320. A polygon mirror 301 may have a cross-sectional shape of any suitable polygon, such as for example, a triangle (with three reflecting surfaces 320), square (with four reflecting surfaces 320), pentagon (with five reflecting surfaces 320), hexagon (with six reflecting surfaces 320), heptagon (with seven reflecting surfaces 320), or octagon (with eight reflecting surfaces 320). In FIG. 3, the polygon mirror 301 has a substantially square cross-sectional shape and four reflecting surfaces (320A, 320B, 320C, and 320D). The polygon mirror 301 in FIG. 3 may be referred to as a square mirror, a cube mirror, or a four-sided polygon mirror. In FIG. 3, the polygon mirror 301 may have a shape similar to a cube, cuboid, or rectangular prism. Additionally, the polygon mirror 301 may have a total of six sides, where four of the sides include faces with reflective surfaces (320A, 320B, 320C, and 320D).

In particular embodiments, a polygon mirror 301 may be continuously rotated in a clockwise or counter-clockwise rotation direction about a rotation axis of the polygon mirror 301. The rotation axis may correspond to a line that is perpendicular to the plane of rotation of the polygon mirror 301 and that passes through the center of mass of the polygon mirror 301. In FIG. 3, the polygon mirror 301 rotates in the plane of the drawing, and the rotation axis of the polygon mirror 301 is perpendicular to the plane of the drawing. An electric motor may be configured to rotate a polygon mirror 301 at a substantially fixed frequency (e.g., a rotational frequency of approximately 1 Hz (or 1 revolution per second), 10 Hz, 50 Hz, 100 Hz, 500 Hz, or 1,000 Hz). As an example, a polygon mirror 301 may be mechanically coupled to an electric motor (e.g., a synchronous electric motor) which is configured to spin the polygon mirror 301 at a rotational speed of approximately 160 Hz (or, 9600 revolutions per minute (RPM)).

In particular embodiments, output beam 125 may be reflected sequentially from the reflective surfaces 320A, 320B, 320C, and 320D as the polygon mirror 301 is rotated. This results in the output beam 125 being scanned along a particular scan axis (e.g., a horizontal or vertical scan axis) to produce a sequence of scan lines, where each scan line corresponds to a reflection of the output beam 125 from one of the reflective surfaces of the polygon mirror 301. In FIG. 3, the output beam 125 reflects off of reflective surface 320A to produce one scan line. Then, as the polygon mirror 301 rotates, the output beam 125 reflects off of reflective surfaces 320B, 320C, and 320D to produce a second, third, and fourth respective scan line. In particular embodiments, a lidar system 100 may be configured so that the output beam 125 is first reflected from polygon mirror 301 and then from scan mirror 302 (or vice versa). As an example, an output beam 125 from light source 110 may first be directed to polygon mirror 301, where it is reflected by a reflective surface of the polygon mirror 301, and then the output beam 125 may be directed to scan mirror 302, where it is reflected by reflective surface 320 of the scan mirror 302. In the example of FIG. 3, the output beam 125 is reflected from the polygon mirror 301 and the scan mirror 302 in the reverse order. In FIG. 3, the output beam 125 from light source 110 is first directed to the scan mirror 302, where it is reflected by reflective surface 320, and then the output beam 125 is directed to the polygon mirror 301, where it is reflected by reflective surface 320A.

Figure 4:
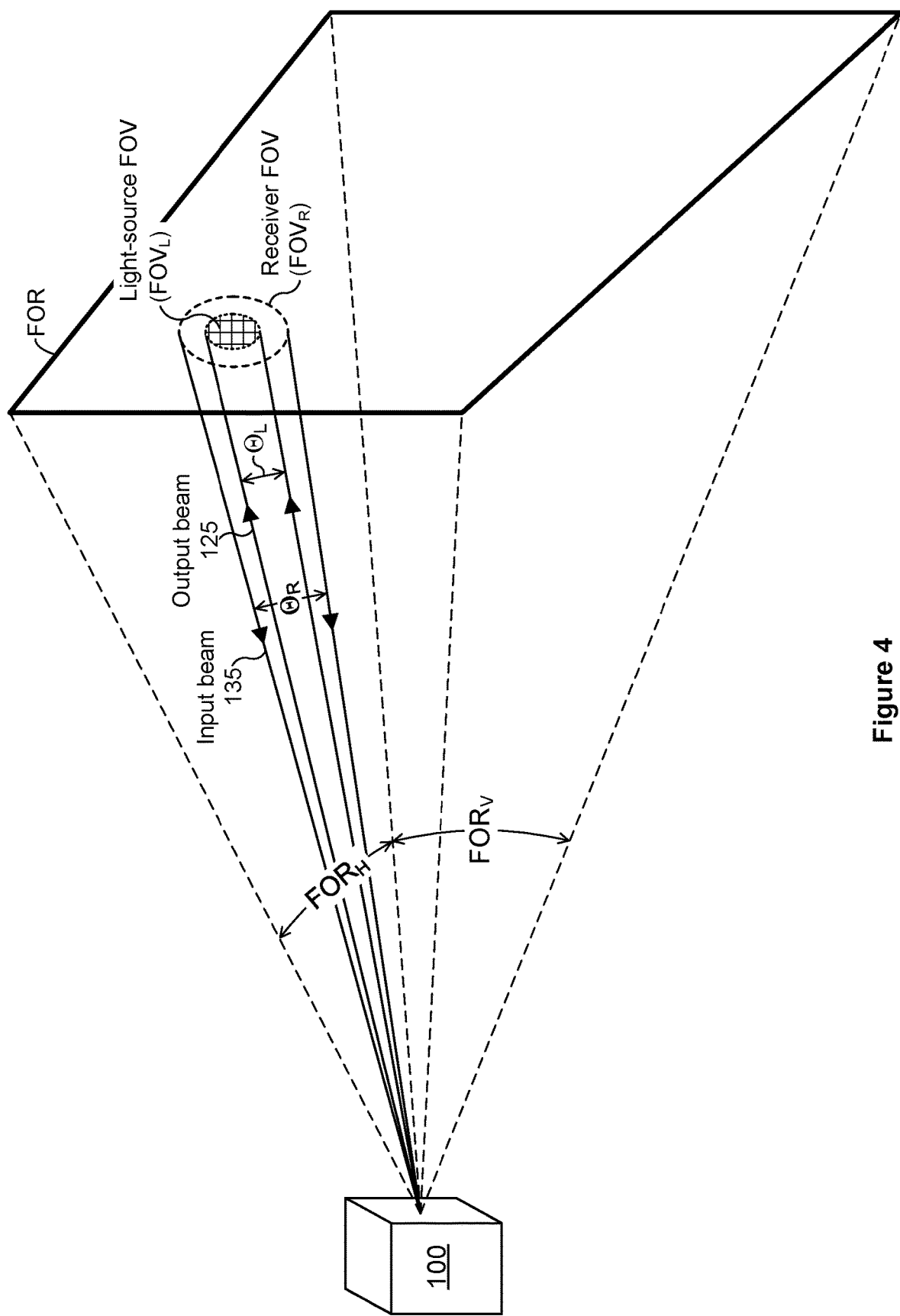
FIG. 4 illustrates an example light-source field of view ($FOV_L$) and receiver field of view ($FOV_R$) for a lidar system.

FIG. 4 illustrates an example light-source field of view ($FOV_L$) and receiver field of view ($FOV_R$) for a lidar system 100. A light source 110 of lidar system 100 may emit pulses of light as the $FOV_L$ and $FOV_R$ are scanned by scanner 120 across a field of regard (FOR). In particular embodiments, a light-source field of view may refer to an angular cone illuminated by the light source 110 at a particular instant of time. Similarly, a receiver field of view may refer to an angular cone over which the receiver 140 may receive or detect light at a particular instant of time, and any light outside the receiver field of view may not be received or detected. As an example, as the light-source field of view is scanned across a field of regard, a portion of a pulse of light emitted by the light source 110 may be sent downrange from lidar system 100, and the pulse of light may be sent in the direction that the $FOV_L$ is pointing at the time the pulse is emitted. The pulse of light may scatter off a target 130, and the receiver 140 may receive and detect a portion of the scattered light that is directed along or contained within the $FOV_R$.

In particular embodiments, scanner 120 may be configured to scan both a light-source field of view and a receiver field of view across a field of regard of the lidar system 100. Multiple pulses of light may be emitted and detected as the scanner 120 scans the $FOV_L$ and $FOV_R$ across the field of regard of the lidar system 100 while tracing out a scan pattern 200. In particular embodiments, the light-source field of view and the receiver field of view may be scanned synchronously with respect to one another, so that as the $FOV_L$ is scanned across a scan pattern 200, the $FOV_R$ follows substantially the same path at the same scanning speed. Additionally, the $FOV_L$ and $FOV_R$ may maintain the same relative position to one another as they are scanned across the field of regard. As an example, the $FOV_L$ may be substantially overlapped with or centered inside the $FOV_R$ (as illustrated in FIG. 4), and this relative positioning between $FOV_L$ and $FOV_R$ may be maintained throughout a scan. As another example, the $FOV_R$ may lag behind the $FOV_L$ by a particular, fixed amount throughout a scan (e.g., the $FOV_R$ may be offset from the $FOV_L$ in a direction opposite the scan direction).

In particular embodiments, the $FOV_L$ may have an angular size or extent $\Theta_L$ that is substantially the same as or that corresponds to the divergence of the output beam 125, and the $FOV_R$ may have an angular size or extent $\Theta_R$ that corresponds to an angle over which the receiver 140 may receive and detect light. In particular embodiments, the receiver field of view may be any suitable size relative to the light-source field of view. As an example, the receiver field of view may be smaller than, substantially the same size as, or larger than the angular extent of the light-source field of view. In particular embodiments, the light-source field of view may have an angular extent of less than or equal to 50 milliradians, and the receiver field of view may have an angular extent of less than or equal to 50 milliradians. The $FOV_L$ may have any suitable angular extent $\Theta_L$, such as for example, approximately 0.1 mrad, 0.2 mrad, 0.5 mrad, 1 mrad, 1.5 mrad, 2 mrad, 3 mrad, 5 mrad, 10 mrad, 20 mrad, 40 mrad, or 50 mrad. Similarly, the $FOV_R$ may have any suitable angular extent OR, such as for example, approximately 0.1 mrad, 0.2 mrad, 0.5 mrad, 1 mrad, 1.5 mrad, 2 mrad, 3 mrad, 5 mrad, 10 mrad, 20 mrad, 40 mrad, or 50 mrad. In particular embodiments, the light-source field of view and the receiver field of view may have approximately equal angular extents. As an example, $\Theta_L$ and $\Theta_R$ may both be approximately equal to 1 mrad, 2 mrad, or 4 mrad. In particular embodiments, the receiver field of view may be larger than the light-source field of view, or the light-source field of view may be larger than the receiver field of view. As an example, $\Theta_L$ may be approximately equal to 3 mrad, and $\Theta_R$ may be approximately equal to 4 mrad. As another example, $\Theta_R$ may be approximately L times larger than $\Theta_L$, where L is any suitable factor, such as for example, 1.1, 1.2, 1.5, 2, 3, 5, or 10.

In particular embodiments, a pixel 210 may represent or may correspond to a light-source field of view or a receiver field of view. As the output beam 125 propagates from the light source 110, the diameter of the output beam 125 (as well as the size of the corresponding pixel 210) may increase according to the beam divergence $\Theta_L$. As an example, if the output beam 125 has a $\Theta_L$ of 2 mrad, then at a distance of 100 m from the lidar system 100, the output beam 125 may have a size or diameter of approximately 20 cm, and a corresponding pixel 210 may also have a corresponding size or diameter of approximately 20 cm. At a distance of 200 m from the lidar system 100, the output beam 125 and the corresponding pixel 210 may each have a diameter of approximately 40 cm.

Figure 5:
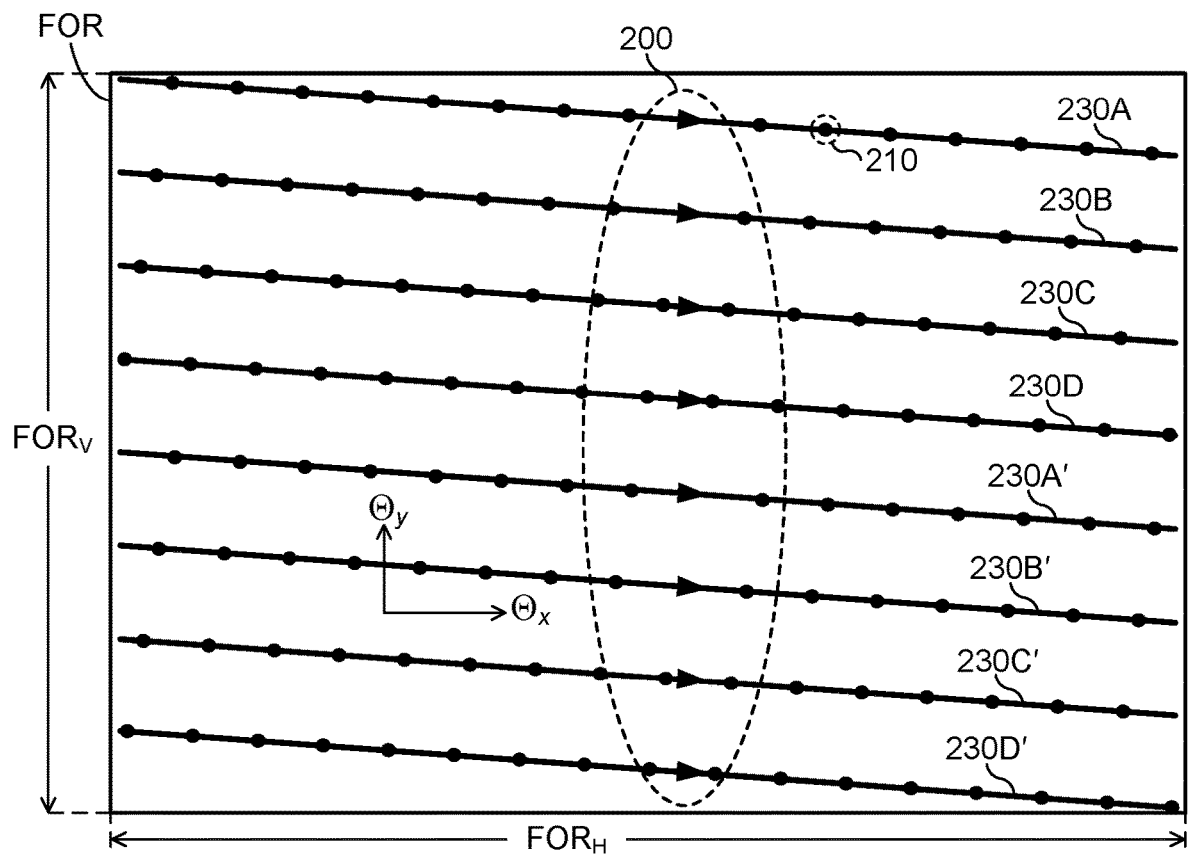
FIG. 5 illustrates an example unidirectional scan pattern that includes multiple pixels and multiple scan lines.

FIG. 5 illustrates an example unidirectional scan pattern 200 that includes multiple pixels 210 and multiple scan lines 230. In particular embodiments, scan pattern 200 may include any suitable number of scan lines 230 (e.g., approximately 1, 2, 5, 10, 20, 50, 100, 500, or 1,000 scan lines), and each scan line 230 of a scan pattern 200 may include any suitable number of pixels 210 (e.g., 1, 2, 5, 10, 20, 50, 100, 200, 500, 1,000, 2,000, or 5,000 pixels). The scan pattern 200 illustrated in FIG. 5 includes eight scan lines 230, and each scan line 230 includes approximately 16 pixels 210. In particular embodiments, a scan pattern 200 where the scan lines 230 are scanned in two directions (e.g., alternately scanning from right to left and then from left to right) may be referred to as a bidirectional scan pattern 200, and a scan pattern 200 where the scan lines 230 are scanned in the same direction may be referred to as a unidirectional scan pattern 200. The scan pattern 200 in FIG. 5 may be referred to as a unidirectional scan pattern 200 where each scan line 230 travels across the FOR in substantially the same direction (e.g., approximately from left to right as viewed from the lidar system 100). In particular embodiments, scan lines 230 of a unidirectional scan pattern 200 may be directed across a FOR in any suitable direction, such as for example, from left to right, from right to left, from top to bottom, from bottom to top, or at any suitable angle (e.g., at a 0°, 5°, 10°, 30°, or 45° angle) with respect to a horizontal or vertical axis. In particular embodiments, each scan line 230 in a unidirectional scan pattern 200 may be a separate line that is not directly connected to a previous or subsequent scan line 230.

In particular embodiments, a unidirectional scan pattern 200 may be produced by a scanner 120 that includes a polygon mirror (e.g., polygon mirror 301 of FIG. 3), where each scan line 230 is associated with a particular reflective surface 320 of the polygon mirror. As an example, reflective surface 320A of polygon mirror 301 in FIG. 3 may produce scan line 230A in FIG. 5. Similarly, as the polygon mirror 301 rotates, reflective surfaces 320B, 320C, and 320D may successively produce scan lines 230B, 230C, and 230D, respectively. Additionally, for a subsequent revolution of the polygon mirror 301, the scan lines 230A', 230B', 230C', and 230D' may be successively produced by reflections of the output beam 125 from reflective surfaces 320A, 320B, 320C, and 320D, respectively. In particular embodiments, N successive scan lines 230 of a unidirectional scan pattern 200 may correspond to one full revolution of a N-sided polygon mirror. As an example, the four scan lines 230A, 230B, 230C, and 230D in FIG. 5 may correspond to one full revolution of the four-sided polygon mirror 301 in FIG. 3. Additionally, a subsequent revolution of the polygon mirror 301 may produce the next four scan lines 230A', 230B', 230C', and 230D' in FIG. 5.

Figure 6:
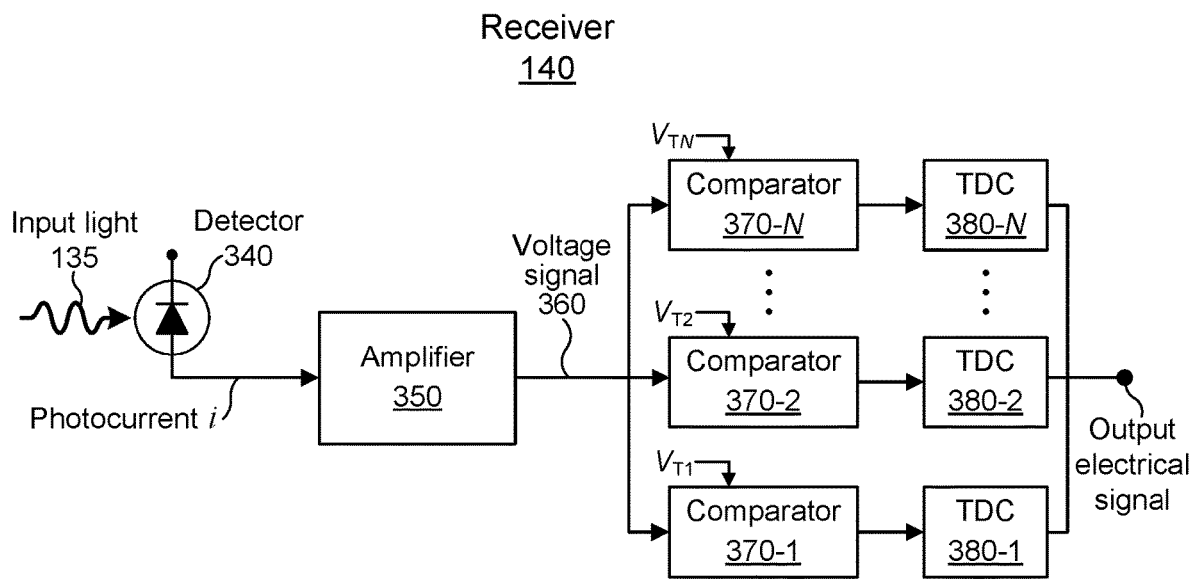
FIG. 6 illustrates an example receiver.

FIG. 6 illustrates an example receiver 140. In particular embodiments, a receiver 140 of a lidar system 100 may include one or more detectors 340, one or more amplifiers 350, or one or more comparators 370. Additionally, a receiver 140 may include one or more time-to-digital converters (TDCs) 380 associated with each of the comparators 370. A light source 110 of a lidar system 100 may emit an optical signal, and a receiver 140 may be configured to detect a received optical signal (e.g., input light 135) that includes a portion of the emitted optical signal that is scattered by a remote target 130.

The example receiver 140 illustrated in FIG. 6 includes a detector 340 configured to receive an input optical signal (input light 135) and produce a photocurrent i that corresponds to the received optical signal. The detector 340 may include an APD, PN photodiode, or PIN photodiode, and the photocurrent i produced by the detector 340 may be referred to as a photocurrent signal or an electrical-current signal. The detector 340 is coupled to an electronic amplifier 350 configured to receive the photocurrent i and produce a voltage signal 360 that corresponds to the received photocurrent. For example, the detector 340 may be an APD that produces a pulse of photocurrent in response to detecting an input optical pulse, and the voltage signal 360 may be an analog voltage pulse that corresponds to the pulse of photocurrent. The amplifier 350 may include a transimpedance amplifier configured to receive the photocurrent i and produce a voltage signal that corresponds to the photocurrent signal. Additionally, the amplifier 350 may include a voltage amplifier that amplifies the voltage signal or an electronic filter (e.g., a low-pass filter) that filters the photocurrent or the voltage signal.

In FIG. 6, the voltage signal 360 produced by the amplifier 350 is coupled to N comparators (comparators 370-1, 370-2, . . . , 370-N), and each comparator is supplied with a particular threshold or reference voltage ($V_{T1}$, $V_{T2}$, . . . , $V_{TN}$). For example, receiver 140 may include N=10 comparators, and the threshold voltages may be set to 10 values between 0 volts and 1 volt (e.g., $V_{T1}$=0.1 V, $V_{T2}$=0.2 V, and $V_{T10}$=1.0 V). A comparator may produce an edge signal (e.g., a rising or falling electrical edge) when the voltage signal 360 rises above or falls below a particular threshold voltage. For example, comparator 370-2 may produce a rising edge when the voltage signal 360 rises above the threshold voltage $V_{T2}$. Additionally or alternatively, comparator 370-2 may produce a falling edge when the voltage signal 360 falls below the threshold voltage $V_{T2}$.

The receiver 140 in FIG. 6 includes N time-to-digital converters (TDCs 380-1, 380-2, . . . , 380-N), and each comparator is coupled to one of the TDCs. Each TDC may act as a timer that produces an output electrical signal (e.g., a digital signal, a digital word, or a digital value) that represents a time when an edge signal is received from a comparator. For example, if the voltage signal 360 rises above the threshold voltage $V_{T1}$, then the comparator 370-1 may produce an edge signal that is supplied to the input of TDC 380-1, and the TDC 380-1 may produce a digital value corresponding to a time when the edge signal was received by TDC 380-1. The digital time value may be referenced to the time when a pulse of light is emitted, and the digital time value may correspond to a round-trip time for the pulse of light to travel to a target 130 and back to the lidar system 100. Each comparator-TDC pair in FIG. 6 (e.g., comparator 370-1 and TDC 380-1) may be referred to as a threshold detector.

In FIG. 6, the amplifier 350, comparators 370, and TDCs 380 together may be referred to as a pulse-detection circuit. For example, if an input light signal 135 includes an optical pulse, a pulse-detection circuit may receive an electrical-current pulse (photocurrent i) from detector 340 and produce an output electrical signal that corresponds to the received optical pulse. In particular embodiments, an output electrical signal produced by a receiver 140 may be a digital signal that corresponds to an input light signal 135. For example, the output electrical signal may be a digital signal that corresponds to the analog voltage signal 360, which in turn corresponds to the photocurrent signal i, which in turn corresponds to the input light signal 135. As another example, the output electrical signal may include a series of digital values that represent the analog voltage signal 360, and the analog voltage signal 360 may in turn correspond to the photocurrent signal i, which in turn corresponds to the input light signal 135.

In particular embodiments, an output electrical signal may include one or more digital values that each correspond to a time interval between (1) a time when an optical signal 125 is emitted and (2) a time when an input light signal 135 is received by a receiver 140. The output electrical signal in FIG. 6 may include digital values from each of the TDCs that receive an edge signal from a comparator, and each digital value may represent a time interval between the emission of an optical pulse by a light source 110 and the receipt of an edge signal from a comparator. For example, a light source 110 may emit a pulse of light that is scattered by a target 130, and a receiver 140 may receive a portion of the scattered pulse of light as an input optical signal 135. The TDCs in the receiver 140 may be reset to zero counts, and when the light source 110 emits the pulse of light, the TDCs may begin to accumulate counts that correspond to elapsed time (e.g., the TDCs may count in terms of clock cycles or some fraction of clock cycles). When TDC 380-1 receives an edge signal from comparator 370-1, the TDC 380-1 may stop accumulating time counts and may produce a digital signal that represents the time interval between emission of the optical pulse and receipt of the edge signal. For example, the digital signal may include a digital value that corresponds to the number of clock cycles that elapsed between emission of the optical pulse and receipt of the edge signal. Alternatively, the TDCs in receiver 140 may accumulate counts continuously over two or more pulse periods (e.g., the TDCs may accumulate counts for a time corresponding to the emission of approximately 10, 100, 1,000, or 10,000 pulses). When a pulse of light is emitted, the TDC count may be stored in memory, and when a TDC receives a subsequent edge signal from a comparator, the count of that TDC may also be stored in memory. The output electrical signal may include digital values corresponding to one or more times when pulses of light were emitted and one or more times when a TDC received an edge signal. The output electrical signal from the TDCs may correspond to the input light signal 135 detected by the detector 340 and may include the digital values from each of the TDCs that receive an edge signal from a comparator. The output electrical signal may be sent to a controller 150, and the controller may determine the distance to the target 130 based at least in part on the output electrical signal. Additionally or alternatively, the controller 150 may determine an optical characteristic of the input light signal 135 based at least in part on the output electrical signal received from the TDCs.

In particular embodiments, a receiver 140 of a lidar system 100 may include one or more analog-to-digital converters (ADCs). As an example, instead of including multiple comparators and TDCs, a receiver 140 may include an ADC that receives a voltage signal 360 from amplifier 350 and produces a digitized output electrical signal corresponding to the voltage signal 360. Although this disclosure describes or illustrates example receivers 140 that include one or more comparators 370 and one or more TDCs 380, a receiver 140 may additionally or alternatively include one or more ADCs. As an example, in FIG. 6, instead of the N comparators 370 and N TDCs 380, the receiver 140 may include an ADC configured to receive the voltage signal 360 and provide an output electrical signal that includes digitized values that correspond to the voltage signal 360.

Figure 7:
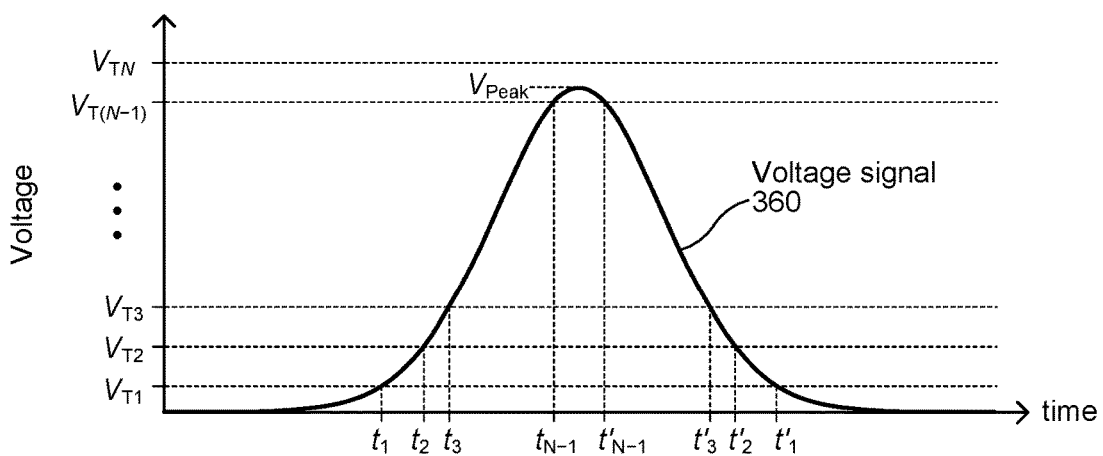
FIG. 7 illustrates an example voltage signal corresponding to a received optical signal.

FIG. 7 illustrates an example voltage signal 360 corresponding to a received optical signal 135. The voltage signal 360 illustrated in FIG. 7 may be an analog signal produced by an electronic amplifier 350 and may correspond to a pulse of light detected by the receiver 140 in FIG. 6. The voltage levels on the y-axis correspond to the threshold voltages $V_{T1}$, $V_{T2}$, . . . , $V_{TN}$ of the respective comparators 370-1, 370-2, . . . , 370-N. The time values $t_1$, $t_2$, $t_3$, . . . , $t_{N-1}$ correspond to times when the voltage signal 360 exceeds the corresponding threshold voltages, and the time values $t'_1$, $t'_2$, $t'_3$, . . . , $t'_{N-1}$ correspond to times when the voltage signal 360 falls below the corresponding threshold voltages. For example, at time $t_1$ when the voltage signal 360 exceeds the threshold voltage $V_{T1}$, comparator 370-1 may produce an edge signal, and TDC 380-1 may output a digital value corresponding to the time $t'_1$. Additionally, the TDC 380-1 may output a digital value corresponding to the time $t'_1$ when the voltage signal 360 falls below the threshold voltage $V_{T1}$. Alternatively, the receiver 140 may include an additional TDC (not illustrated in FIG. 6) configured to produce a digital value corresponding to time $t'_1$ when the voltage signal 360 falls below the threshold voltage $V_{T1}$. The output electrical signal from receiver 140 may include one or more digital values that correspond to one or more of the time values $t_1$, $t_2$, $t_3$, . . . , $t_{N-1}$ and $t'_1$, $t'_2$, $t'_3$, . . . , $t'_{N-1}$. Additionally, the output electrical signal may also include one or more values corresponding to the threshold voltages associated with the time values. Since the voltage signal 360 in FIG. 7 does not exceed the threshold voltage $V_{TN}$, the corresponding comparator 370-N may not produce an edge signal. As a result, TDC 380-N may not produce a time value, or TDC 380-N may produce an output electrical signal indicating that no edge signal was received.

In particular embodiments, an output electrical signal produced by a receiver 140 may correspond to or may be used to determine an optical characteristic of a received optical signal detected by the receiver 140. An optical characteristic may correspond to a peak optical intensity of a received optical signal, a peak optical power of a received optical signal, an average optical power of a received optical signal, an optical energy of a received optical signal (e.g., the energy of a received optical pulse), a temporal duration of a received optical signal (e.g., the temporal duration of a received optical pulse), a shape or amplitude of a received optical signal (e.g., the temporal shape of a received optical pulse), or a center of a received optical signal (e.g., a time associated with a temporal center of a received optical pulse). For example, an optical pulse detected by receiver 140 may have one or more of the following optical characteristics: a peak optical power of between 1 nanowatt and 10 watts; a pulse energy of between 1 attojoule and 10 nanojoules; and a pulse duration of between 0.1 ns and 50 ns. In particular embodiments, an optical characteristic of a received optical signal may be determined from an output electrical signal provided by one or more TDCs 380 of a receiver 140 (e.g., as illustrated in FIG. 6), or an optical characteristic may be determined from an output electrical signal provided by one or more ADCs of a receiver 140. An optical characteristic may be referred to as a preliminary optical characteristic or a preliminary value of an optical characteristic.

In particular embodiments, a peak optical power or peak optical intensity of a received optical signal may be determined from one or more values of an output electrical signal provided by a receiver 140. As an example, a controller 150 may determine the peak optical power of an input optical pulse 135 based on a peak voltage ($V_{peak}$) of the voltage signal 360. The controller 150 may use a formula or lookup table that correlates a peak voltage of the voltage signal 360 with a peak optical power of a received optical signal. In the example of FIG. 7, the peak optical power of an input optical pulse may be determined from the threshold voltage $V_{T(N-1)}$, which is approximately equal to the peak voltage $V_{peak}$ of the voltage signal 360 (e.g., the threshold voltage $V_{T(N-1)}$ may be associated with an input optical pulse 135 having a peak optical power of 10 mW). As another example, a controller 150 may apply a curve-fit or interpolation operation to the values of an output electrical signal to determine the peak voltage of the voltage signal 360, and then this peak voltage may be used to determine the peak optical power of an input optical pulse.

In particular embodiments, an energy of a received optical signal may be determined from one or more values of an output electrical signal. For example, a controller 150 may perform a summation of digital values that correspond to a voltage signal 360 to determine an area under the voltage-signal curve, and the area under the voltage-signal curve may be correlated with a pulse energy of an input optical pulse 135. As an example, the approximate area under the voltage-signal curve in FIG. 7 may be determined by subdividing the curve into M subsections (where M is approximately the number of time values included in the output electrical signal) and adding up the areas of each of the subsections (e.g., using a numerical integration technique such as a Riemann sum, trapezoidal rule, or Simpson's rule). For example, the approximate area A under the voltage-signal curve 360 in FIG. 7 may be determined from a Riemann sum using the expression $A=\Sigma_{k=1}^{M} V_{Tk} \times \Delta t_k$, where $V_{Tk}$ is a threshold voltage associated with the time value $t_k$, and $\Delta t_k$ is a width of the subsection associated with time value $t_k$. In the example of FIG. 7, the voltage signal 360 may correspond to a received optical pulse with a pulse energy of 1 picojoule.

In particular embodiments, a duration of a received optical signal may be determined from a duration or width of a corresponding voltage signal 360. For example, the difference between two time values of an output electrical signal may be used to determine a duration of an optical pulse. In the example of FIG. 7, the duration of the optical signal corresponding to voltage signal 360 may be determined from the difference ($t'_3 - t'_3$), which may correspond to a received optical pulse with a pulse duration of 2 nanoseconds. One or more of the approaches for determining an optical characteristic of a received optical signal as described above may be implemented using a receiver 140 that includes multiple comparators 370 and TDCs 380 (as illustrated in FIG. 6) or using a receiver 140 that includes one or more ADCs.

In particular embodiments, one or more output electrical signals produced by one or more receivers 140 may be used to compare optical characteristics of two or more optical pulses detected by the receivers. For example, a receiver 140 may include two detectors 340 configured to detect two separate optical pulses (e.g., each detector may detect a different portion of a received optical pulse). An optical characteristic of the two optical pulses may be compared based on one or more output electrical signals associated with the two pulses and produced by the receiver 140. For example, a controller 150 may determine the peak voltages of two voltage signals 360 associated with the two optical pulses. The voltage signal 360 with the higher peak voltage may correspond to the optical pulse having a higher peak optical power or peak optical intensity. Rather than determining values for the optical power or intensity of two optical pulses (e.g., by using a formula or lookup table), a controller 150 may compare the peak voltage values of one or more output electrical signals to determine which pulse has the higher peak optical power or intensity. As another example, a controller 150 may compare the areas under two voltage-signal curves to compare the energy of the two corresponding optical pulses. The voltage-signal curve with the larger area may correspond to the optical pulse having a larger pulse energy. Rather than determining values for the pulse energy of two optical pulses, a controller 150 may compare the area of two voltage-signal curves to determine which pulse has the higher pulse energy.

Figure 8:
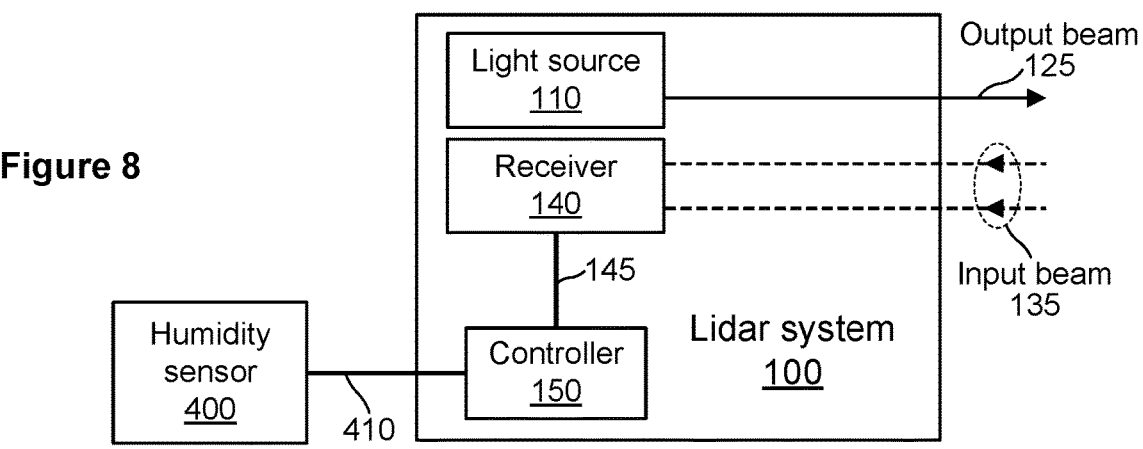
FIG. 8 illustrates an example lidar system coupled to a humidity sensor.

FIG. 8 illustrates an example lidar system 100 coupled to a humidity sensor 400. The lidar system 100 in FIG. 8 includes a light source 110 that emits an optical signal (output beam 125), a receiver 140 that receives an input beam 135, and a controller 150 that receives an output electrical signal 145 from the receiver 140. The output beam 125 may be directed into a field of regard (FOR) of the lidar system 100, and the receiver 140 may receive, as input beam 135, a portion of the output beam 125 that is scattered by a target (not illustrated in FIG. 8) located a distance from the lidar system 100 and located at least partially within the FOR of the lidar system 100. The receiver 140 may produce an output electrical signal 145 that corresponds to the received optical signal 135. Additionally, the output electrical signal 145 may correspond to or may be related to a preliminary value of an optical characteristic of the received optical signal 135. For example, based on the output electrical signal 145, the receiver 140 or the controller 150 may determine a preliminary value of an optical characteristic of the received optical signal 135. If the received optical signal 135 includes a pulse of light, the preliminary value of the optical characteristic determined from the output electrical signal 145 may correspond to the peak optical intensity, the peak optical power, or the optical energy of the received pulse of light.

In particular embodiments, a light source 110 of a lidar system 100 may have a fixed operating wavelength, a tunable operating wavelength, or an operating wavelength that is adjustable to different discrete wavelengths. For example, a light source 110 with a fixed operating wavelength may produce an output beam 125 having a single wavelength between approximately 900 nm and approximately 1700 nm. As another example, a wavelength-tunable light source 110 may be tuned to operate at any wavelength within a particular wavelength range, such as for example from approximately 1320 nm to approximately 1400 nm. As another example, an adjustable-wavelength light source 110 may be configured to operate at two or more particular discrete wavelengths, such as for example, 1340 nm and 1380 nm, or 1340 nm and 1550 nm.

The humidity sensor 400 in FIG. 8 may be any suitable type of device configured to provide a value or a signal that represents the humidity of the air around the lidar system 100. For example, humidity sensor 400 may include any suitable hygrometer configured to measure humidity, such as for example, a capacitive hygrometer, a resistive hygrometer, a thermal hygrometer, a gravimetric hygrometer, or an optical hygrometer. A humidity value provided by humidity sensor 400 may include a value that corresponds to the absolute humidity, relative humidity, or specific humidity for a region around the lidar system 100. For example, the humidity value may be expressed as an absolute humidity value in terms of the concentration of water vapor in the air and may have units of grams of water vapor per cubic meter of air (e.g., g/m³) or grams of water vapor per kilogram of air (e.g., g/kg). The humidity value may correspond to an amount or a concentration of water vapor in the air near or around a lidar system 100, such as for example, a concentration of water vapor in a region of air located within approximately 1 m, 10 m, 100 m, 1 km, or 10 km of the lidar system 100, or within approximately 1 m, 10 m, 100 m, 1 km, or 10 km of the FOR of the lidar system 100.

In particular embodiments, a humidity sensor 400 may be located within, on, or near a lidar system 100. For example, a humidity sensor 400 may be integrated into or onto a lidar system 100, and the humidity sensor 400 may determine the humidity for air located near or around the lidar system 100. As another example, a humidity sensor 400 may be located within or on a vehicle, and the humidity sensor 400 may provide humidity information to one or more lidar systems 100 located within or on the same vehicle. A humidity sensor 400 may provide humidity information to the controller 150 of a lidar system 100 via a direct electrical connection (e.g., via a wire or cable connected between the humidity sensor 400 and the lidar system 100), via an indirect electrical connection (e.g., via an intermediate hub or interface device that is connected to the humidity sensor 400 and the lidar system 100), via a wireless link (e.g., via BLUETOOTH or any other suitable wireless communication protocol), or any suitable combination thereof.

In particular embodiments, a humidity value may be received from a remotely located weather information service. For example, a weather information service may determine the humidity for a location near or around a lidar system 100 (e.g., the location may be within approximately 1 m, 10 m, 100 m, 1 km, or 10 km of the lidar system 100). The weather information service may send a humidity value directly to the controller 150 of the lidar system 100 via a wireless link (e.g., via a cellular network or a satellite link). Alternatively, the humidity value may be sent wirelessly to a wireless receiver, and the wireless receiver may then provide the humidity value to the controller 150 of the lidar system 100. The humidity value may be sent directly from the wireless receiver to the controller 150, or the humidity value may be sent via one or more intermediate hubs or interface devices. The wireless receiver may be part of the lidar system 100 (e.g., located within, on, or near the lidar system 100), or the wireless receiver may be located within or on a vehicle in which the lidar system 100 is installed.

Figure 9:
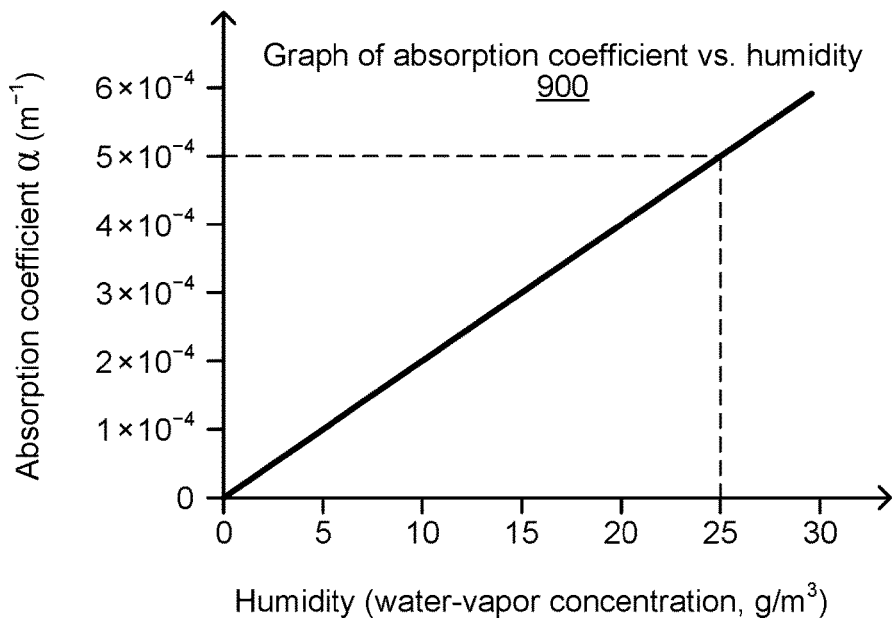
FIG. 9 illustrates an example graph that relates humidity to an optical absorption coefficient.

FIG. 9 illustrates an example graph 900 that relates humidity to an optical absorption coefficient. An optical signal emitted by a lidar system 100 may experience absorption by water vapor as the optical signal propagates through the air from the lidar system 100 to a remote target 130 and back to the lidar system 100. The amount of optical absorption of the optical signal may be related to the humidity in the air through which the optical signal propagates. Humidity may refer to the concentration of water vapor in a region near or around the lidar system 100. In FIG. 9, the humidity is expressed in terms of the concentration of water vapor in units of grams of water vapor per cubic meter of air (g/m³). The optical absorption coefficient (α) represents the optical absorption of light by water vapor and is expressed in units of inverse meters (m⁻¹). As humidity increases, the absorption coefficient also increases approximately linearly. For example, at a humidity of 5 g/m³, the optical absorption coefficient associated with water vapor is approximately $1 \times 10^{-4}$ m⁻¹, and at a humidity of 25 g/m³, the optical absorption coefficient associated with water vapor is approximately $5 \times 10^{-4}$ m⁻¹.

In FIG. 9, the optical absorption coefficient α represents the absorption of light at the operating wavelength of a lidar system 100 as a function of humidity. Since the optical absorption of light by water vapor is wavelength dependent, the absorption coefficient may depend on the humidity as well as the wavelength of the emitted optical signal. The line in FIG. 9 represents the absorption coefficient for a particular operating wavelength (e.g., 1340 nm, 1380 nm, 1480 nm, or 1550 nm), and the slope of the line may be different for a lidar system with a different operating wavelength. For example, at a wavelength at which the absorption by water vapor is stronger, the line may have a steeper slope. Similarly, at a wavelength at which the absorption by water vapor is weaker, the line may have a shallower slope.

The transmission or attenuation of light propagating through a material can be related to the absorption and thickness of the material using Beer's law, or any other suitable model of optical absorption. Beer's law is an optical-absorption model that relates the transmission or attenuation of light through a material to (1) the optical absorption (α) of the material through which the light is traveling (in this case, the absorption due to water vapor) and (2) the path length traveled through the material. For an optical signal that travels a distance D to a target and a distance D back to the lidar system 100 (for a total round-trip distance of 2D), the amount of optical transmission (T) experienced by the optical signal may be expressed, according to Beer's law, as $T=e^{-2D\alpha}$, where e is the mathematical constant approximately equal to 2.71828. Similarly, the amount of optical loss or optical absorption (L) due to water vapor may be expressed as $L=1-e^{-2D\alpha}$, since L+T=1. For example, for a humidity value of 10 g/m³, the optical absorption coefficient associated with humidity is approximately $2 \times 10^{-4}$ m⁻¹. For a target 130 located 200 m from the lidar system 100, the optical transmission (based on Beer's law) is $T=e^{-2(200\ m)(0.0002/m)}$, which is approximately equal to 92.3%. The corresponding optical loss is approximately L=(1−0.923), or 7.7%, which indicates that, at a humidity of 10 g/m³, an optical signal traveling to and from an object located 200 meters away loses approximately 7.7% of its optical power or energy due to absorption by water vapor. In addition to the optical loss associated with absorption by water vapor, the total optical loss or attenuation of an optical signal may also include other effects, such as for example, the divergence of the optical beam 125, scattering of the optical signal by a remote target 130, and absorption or scatter by other materials.

Figure 10:
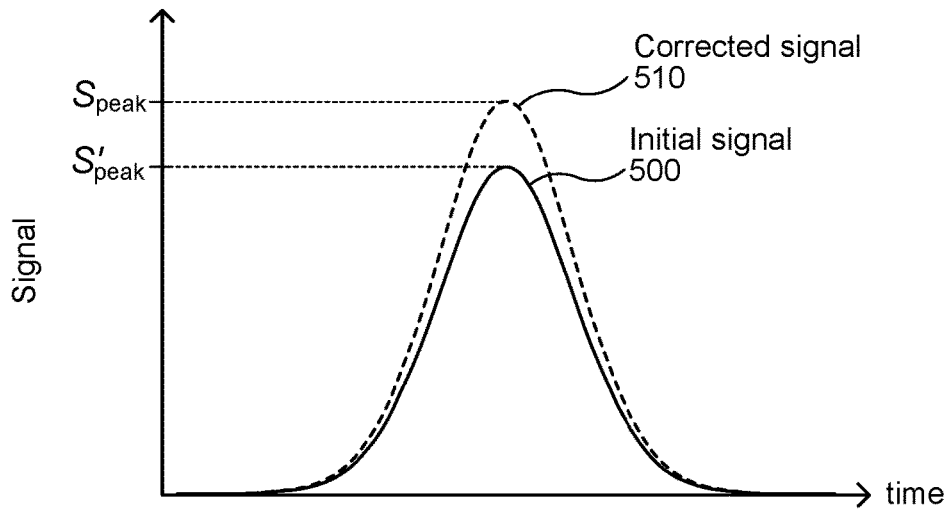
FIG. 10 illustrates an example initial signal and a corresponding corrected signal.

FIG. 10 illustrates an example initial signal 500 and a corresponding corrected signal 510. The initial signal 500 may correspond to a received optical signal (e.g., input light 135), a photocurrent i produced by a detector 340, a voltage signal 360 produced by an amplifier 350, or an output electrical signal produced by a receiver 140. The corrected signal 510 corresponds to the initial signal 500 after compensating for optical absorption associated with humidity. For example, the initial signal 500 may correspond to the voltage signal 360 in FIG. 7 produced by the amplifier 350 in FIG. 6, in response to a pulse of light received by detector 340. The corrected signal 510 may correspond to the voltage signal 360 in FIG. 7 after compensating for optical absorption by water vapor.

In particular embodiments, a humidity correction factor (HCF) may be used to correct for or compensate for the effects of optical absorption of an emitted optical signal by water vapor. The HCF may be related to the amount of optical absorption by water vapor experienced by an emitted optical signal while traveling to a target 130 and back to the lidar system 100. In FIG. 10, the peak value of the corrected signal ($S_{peak}$) may be related to the peak value of the initial signal ($S'_{peak}$) by the expression $S_{peak}=HCF \times S'_{peak}$, and the value of HCF may be determined based on Beer's law or any other suitable optical-absorption model. For example, if the peak value of the initial signal ($S'_{peak}$) corresponds to a 1-μW peak power of a received optical signal, then, for a HCF of 1.2, the peak value of the corrected signal ($S_{peak}$) corresponds to a 1.2-μW peak power. This indicates that if there were no water vapor present (e.g., a humidity value of zero), the received optical signal would have a peak power of approximately 1.2 μW.

Based on Beer's law, the amount of optical absorption due to water vapor experienced by an optical signal traveling a path length of 2D in air may be expressed as $L=1-e^{-2D\alpha}$. The corresponding transmission of the optical signal may be expressed as $T=e^{-2D\alpha}$, and the initial signal 500 corresponds to the corrected signal 510 multiplied by $e^{-2D\alpha}$. That is, the corrected signal 510 is reduced by the factor $e^{-2D\alpha}$, which corresponds to the reduction of an optical signal due to water-vapor absorption while traveling to a target 130 and back to the lidar system 100. The corrected signal 510 may be determined by multiplying the initial signal 500 by $e^{+2D\alpha}$, and the multiplier $e^{+2D\alpha}$ may be referred to as a humidity correction factor (e.g., $HCF=e^{+2D\alpha}$). For a $2\times10^{-4}$ m$^{-1}$ absorption coefficient and a 200-m distance to a target 130, the humidity correction factor is $HCF=e^{2(200\ m)(0.0002/m)}$, which is approximately equal to 1.083. The expression for optical absorption $L=1-e^{-2D\alpha}$ may be written in terms of HCF as $L=1-HCF^{-1}$. Based on this expression relating optical absorption (L) and HCF, the HCF value of 1.083 corresponds to approximately 7.7% optical absorption by water vapor. That is, an optical signal may experience a 7.7% optical loss due to water vapor absorption, and the HCF value of 1.083 may be used to compensate for this optical loss.

In particular embodiments, a corrected value of an optical characteristic of a received optical signal may correspond to a zero-humidity value of the optical characteristic. That is, the corrected value of the optical characteristic may represent a value the optical characteristic would have if the humidity value were zero (e.g., if there were no water vapor in the air around the lidar system 100). If the humidity value were zero, there would be no optical absorption caused by water vapor (e.g., α=0), and the value of HCF would be 1 regardless of the distance D.

In particular embodiments, a processor (e.g., controller 150 of a lidar system 100) may determine a corrected value of an optical characteristic of a received optical signal based at least in part on: (1) an output electrical signal produced by a receiver 140 of the lidar system 100 (e.g., the output electrical signal is produced in response to the received optical signal), (2) a distance D to a remote target 130 (e.g., the received optical signal includes light from an emitted optical signal scattered by the target 130 located a distance D from the lidar system 100), and (3) a humidity value that represents an amount of humidity for a region around the lidar system 100. Determining the corrected value of the optical characteristic may include: (1) determining a preliminary value of the optical characteristic (OC') based at least in part on the output electrical signal produced by the receiver 140, (2) determining the HCF based on the distance D and the humidity value (where, as illustrated in FIG. 9, an absorption coefficient may be determined from the humidity value), and (3) applying the HCF to the preliminary value of the optical characteristic to determine the corrected value of the optical characteristic (OC). Determining OC' (the preliminary value of the optical characteristic) based on the output electrical signal produced by a receiver 140 may use one of the approaches described above with respect to FIG. 7. For example, determining a preliminary value for the optical energy of a received optical signal may include performing a summation of digital values that correspond to a voltage signal 360 to determine an area under the voltage-signal curve.

In particular embodiments, a lidar system 100 may determine a preliminary value for any suitable optical characteristic of a received optical signal, such as for example, a peak optical intensity, a peak optical power, an average optical power, or an optical energy of the received optical signal. Additionally, a lidar system 100 may determine a corrected value of the optical characteristic of the received optical signal from the expression $OC=HCF \times OC'$, where: HCF is the humidity correction factor; OC' is the preliminary value of the optical characteristic of the received optical signal; and OC is the corrected value of the optical characteristic of the received optical signal. The HCF may be determined, based on Beer's law, from the expression $HCF=e^{2D\alpha}$, where D is the distance to the target 130 and α is an absorption coefficient associated with optical absorption of the emitted optical signal by water vapor in the region around the lidar system.

As an example, a controller 150 of a lidar system 100 may determine that a received optical signal has a preliminary value for peak optical power of OC'=1 μW. The received optical signal may include light from an emitted optical signal scattered by a target 130 located a distance D from the lidar system 100. If the round-trip time for the emitted optical signal to travel to the target 130 and back to the lidar system 100 is 1 μs, the controller 150 may determine that the distance D is approximately 150 m. The controller 150 may receive a humidity value of 15 g/m$^3$, which corresponds to the concentration of water vapor in a region around the lidar system 100. The controller 150 may determine that the humidity value corresponds to an optical absorption coefficient of approximately $3\times10^{-4}$ m$^{-1}$. From the relationship $HCF=e^{2D\alpha}$, the 150-m distance and the $3\times10^{-4}$ m$^{-1}$ absorption coefficient correspond to an HCF of approximately 1.094. The corrected value for the peak optical power, which is determined from the expression $OC=HCF \times OC'$, is then $(1.094)\times(1\ \mu W)$, or approximately 1.094 μW. This indicates that if there were no water vapor present in the region around the lidar system 100, the peak optical power of the received optical signal would be approximately 1.094 μW (instead of 1 μW). As another example, a controller 150 may determine that a received optical signal has a preliminary value for optical energy of OC'=1 pJ. If the HCF is determined to be 1.2, then the corrected value for the optical energy is approximately 1.2 pJ. This indicates that with no water vapor present, the optical energy of the received optical signal would be approximately 1.2 pJ (instead of 1 pJ).

In particular embodiments, a processor (e.g., controller 150 of a lidar system 100) may determine a reflectivity value R for a target 130. The reflectivity R may correspond to the ratio of light that is scattered or reflected by a target 130 to light that is incident on the target 130. For example, the reflectivity may correspond to the ratio ($E_{ref}/E_{inc}$), where $E_{inc}$ is the energy of an incident pulse of light and $E_{ref}$ is the energy of the incident pulse of light after being reflected from the target 130. In particular embodiments, a value for the reflectivity of a target 130 may be determined based at least in part on: (1) a distance D to the target 130 and (2) a corrected value of an optical characteristic of a received optical signal. For example, the reflectivity R of a target 130 may be determined from the expression $R=k \cdot D^2(OC_{Rx}/OC_{Tx})$, where: $OC_{Rx}$ is the corrected value of the optical characteristic of the received optical signal; $OC_{Tx}$ is the corresponding optical characteristic of the emitted optical signal; D is the distance to the target 130; and the factor k is a calibration constant. The $D^2$ term accounts for the quadratic decrease in the intensity of scattered light with distance (e.g., the intensity of the received optical signal may decrease with distance as $1/D^2$). The term $OC_{Rx}$ may correspond to the corrected energy of a received optical signal (e.g., a pulse of light), and $OC_{Tx}$ may correspond to the energy of the corresponding emitted optical signal. If a calibration target located a distance of 50 m has a known reflectivity of 90%, and if the ratio ($OC_{Rx}/OC_{Tx}$) is $10^{-5}$, then the calibration factor k may be determined, based on the above expression for reflectivity, to be 36 $m^{-2}$. Once the calibration factor k is known, the reflectivity of other targets 130 may be determined by the lidar system 100. For example, a controller 150 of a lidar system may determine the following parameters: distance to a target is D=100 m; an emitted pulse of light has energy $OC_{Tx}$=1 µJ, and a value for the corrected energy of the received optical signal is $OC_{Rx}$=0.5 pJ. Based on these parameters, the reflectivity of the target 130 may be determined from the expression R=(36 $m^{-2}$)·(100 m)$^2$·(0.5 pJ/1 µJ), so that R is approximately 18%. If the value for the energy of the received optical signal is not corrected (e.g., if the optical absorption due to humidity is not compensated for), then an incorrect value for the reflectivity of the target 130 may be determined.

In particular embodiments, a value for $OC_{Tx}$, the optical characteristic of an emitted optical signal, may be determined dynamically. For example, a lidar system 100 that emits pulses of light may include a detector configured to measure a portion of each emitted pulse of light. The detector may be part of a receiver 140, or the detector may be a separate device (e.g., a PIN photodiode or APD) located elsewhere within the lidar system 100. A value for an optical characteristic ($OC_{Tx}$) of each emitted pulse of light may be determined based on a signal provided by the detector. If scattered light from an emitted pulse of light is received, the value for $OC_{Tx}$ may be applied (along with corresponding values for D and $OC_{Rx}$) to the expression $R=k \cdot D^2(OC_{Rx}/OC_{Tx})$ to determine a reflectivity for a target 130. For a light source 110 that produces pulses of light that vary in pulse energy or peak power, a value for $OC_{Tx}$ may be determined dynamically, since the pulse energy or peak power may change from pulse to pulse.

In particular embodiments, a value for $OC_{Tx}$, the optical characteristic of an emitted optical signal, may be substantially fixed. If a light source 110 produces pulses of light that have approximately the same pulse energy or peak power, then the corresponding value for $OC_{Tx}$ may be fixed. For example, if a light source 110 produces pulses of light with a pulse energy of 1 µJ and relatively small pulse-to-pulse variation in pulse energy (e.g., pulse-energy variation of less than 10%, 5%, 2%, 1%, or any other suitable percentage), then $OC_{Tx}$ may be assigned a constant value corresponding to the 1-µJ energy. For a received optical signal, once the distance D and the corrected value $OC_{Rx}$ are determined, the reflectivity may be determined from the expression $R=k \cdot D^2(OC_{Rx}/OC_{Tx})$, where k and $OC_{Tx}$ are assigned constant values. As another example, once the distance D and the corrected value $OC_{Rx}$ are determined, the reflectivity may be determined from a lookup table that correlates distance and $OC_{Rx}$ with a corresponding reflectivity value R.

A lidar system 100 as described or illustrated herein may be configured to mitigate or compensate for the effects of humidity in measurements performed by the lidar system 100. A lidar system 100 may utilize humidity data to provide a modified or corrected measurement value for an optical characteristic that compensates for optical absorption associated with water vapor. As an example, a lidar system 100 may determine a preliminary value for an optical characteristic of a received optical signal, and the lidar system 100 may apply a humidity correction factor (HCF) to the preliminary value to compensate for the attenuation of the optical signal caused by absorption by water vapor. Applying the correction factor may allow the lidar system to accurately determine a corrected value for an optical characteristic or a value for the reflectivity of a remote target 130. Other conventional lidar systems that are not configured to compensate for the effects of humidity may produce inaccurate data, such as for example, inaccurate values for an optical characteristic of a received optical signal or inaccurate values for the reflectivity of a remote target 130.

Figure 11:
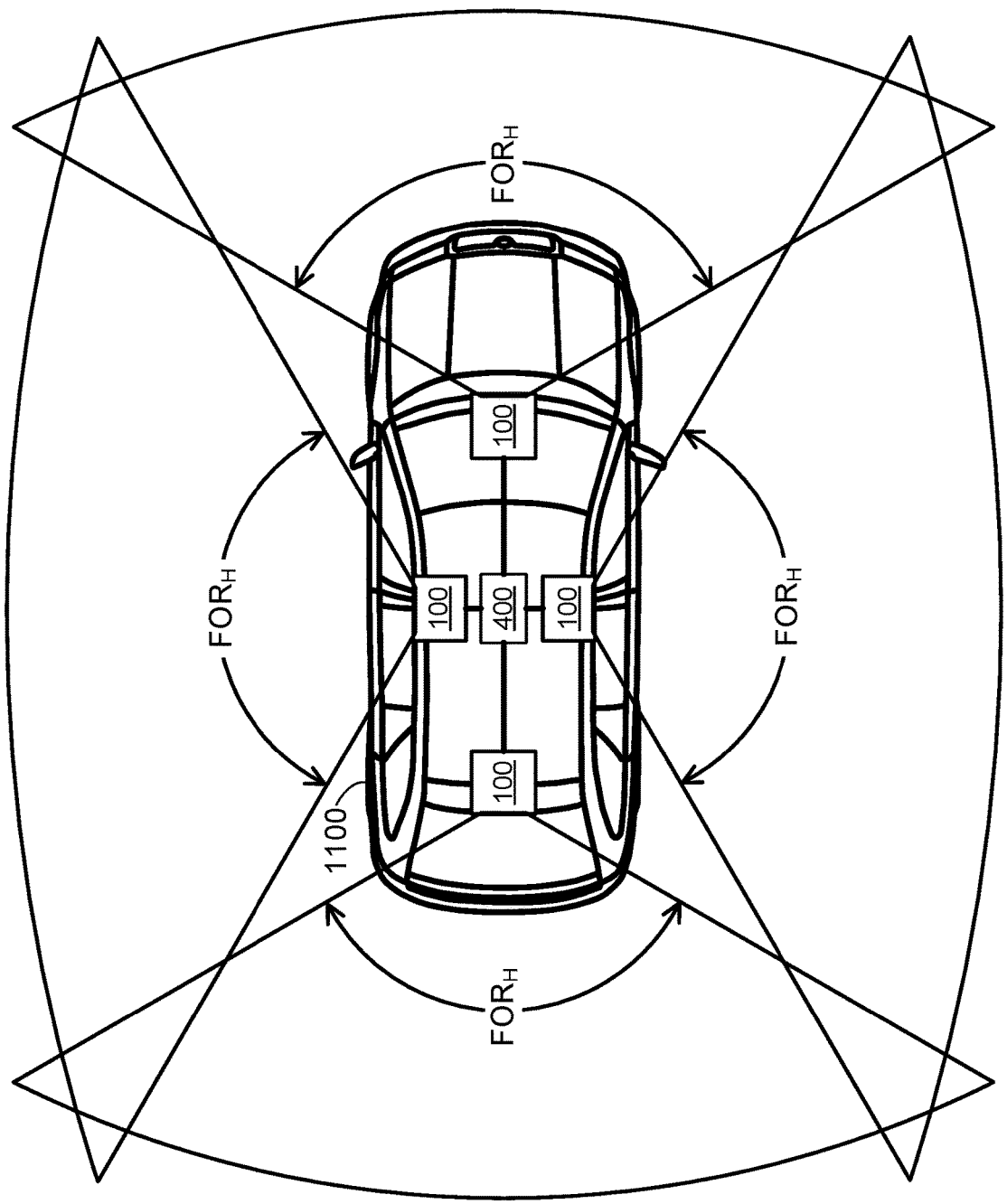
FIG. 11 illustrates an example vehicle equipped with four lidar systems and a humidity sensor.

FIG. 11 illustrates an example vehicle 1100 equipped with four lidar systems 100 and a humidity sensor 400. In particular embodiments, one or more lidar systems 100 may be integrated into a vehicle 1100. The vehicle 1100 may be an autonomous vehicle, and the lidar systems 100 may provide information about the surrounding environment to an autonomous-vehicle driving system. In FIG. 11, four lidar systems 100 are integrated into the vehicle 1100. Each lidar system provides a 120-degree horizontal field of regard ($FOR_H$), and adjacent lidar systems have an angular overlap of approximately 30 degrees. Each lidar system may include an integrated humidity sensor 400, or, as illustrated in FIG. 11, the four lidar systems 100 may receive humidity information from a single humidity sensor 400 located on or in the vehicle 1100. One of more of the lidar systems 100 may use the humidity information to determine a corrected value of an optical characteristic of a received optical signal.

Figure 12:
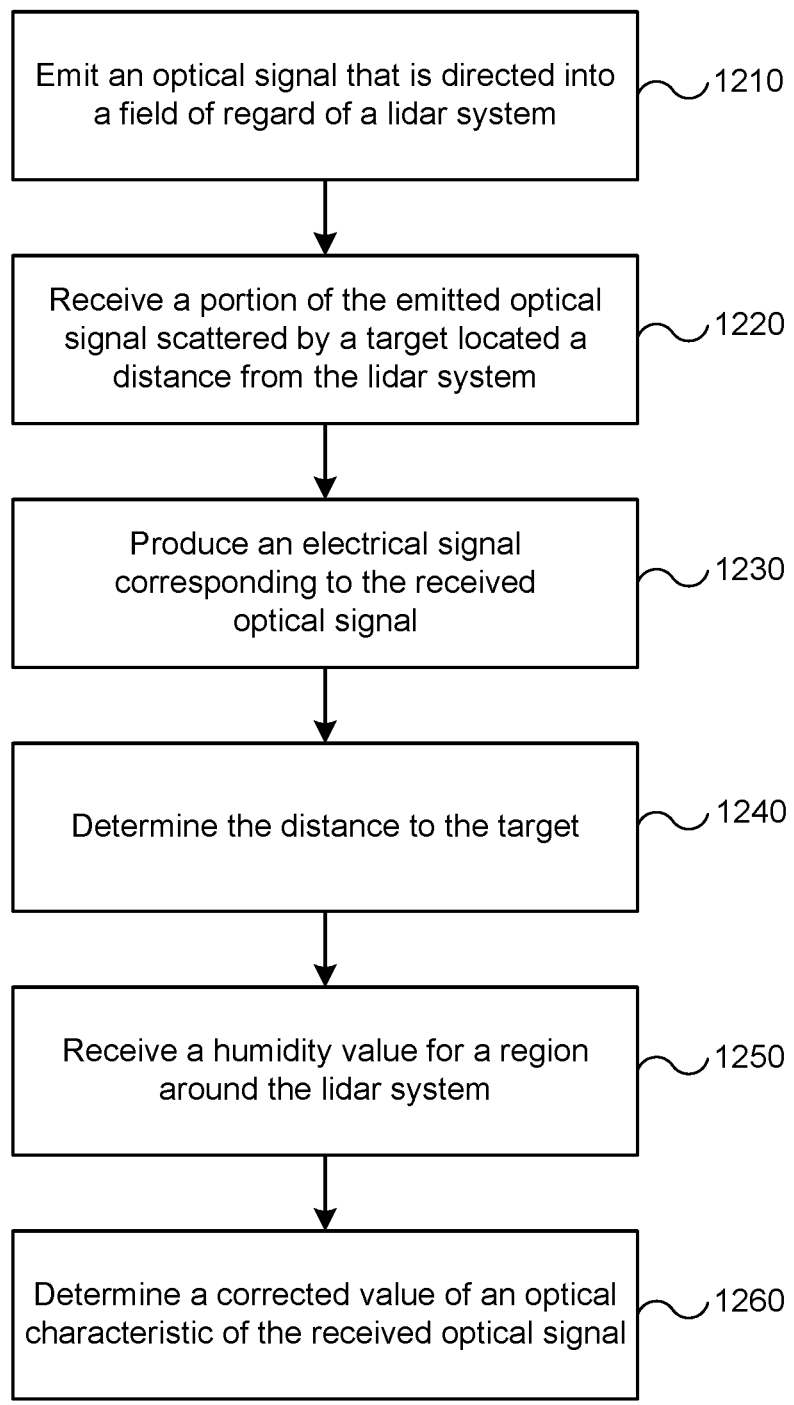
FIG. 12 illustrates an example method for determining a corrected value of an optical characteristic of a received optical signal.

FIG. 12 illustrates an example method 1200 for determining a corrected value of an optical characteristic of a received optical signal. The method 1200 may be implemented in a lidar system 100 and may be used to mitigate or compensate for the effects of humidity in the lidar system measurements. For example, the lidar system 100 in FIG. 8 may emit an optical signal toward a target 130, and method 1200 may be used to compensate for optical absorption experienced by the optical signal due to water vapor as the optical signal travels to the target 130 and back to the lidar system 100. The method may begin at step 1210 where a light source 110 of a lidar system 100 may emit an optical signal that is directed into a field of regard of the lidar system 100. The optical signal may be a pulsed optical signal (e.g., a pulse of light) or a CW optical signal (e.g., a FMCW signal that includes frequency-modulated light). At step 1220, a receiver 140 of the lidar system 100 may receive a portion of the emitted optical signal scattered by a target 130 located a distance from the lidar system 100. At step 1230, the receiver 140 may produce an electrical signal corresponding to the received optical signal. The electrical signal may be related to a preliminary value of an optical characteristic of the received optical signal. For example, the electrical signal may be a digital signal that includes a series of digital values corresponding to the received optical signal, and a preliminary value for the energy, peak power, or peak intensity of the received optical signal may be determined from the electrical signal. At step 1240, a processor (e.g., controller 150) of the lidar system 100 may determine the distance to the target 130. The distance may be determined based at least in part on a round-trip time for a portion of the emitted optical signal to travel to the target 130 and back to the lidar system 100. At step 1250, the processor may receive a humidity value that represents an amount of humidity (e.g., a concentration of water vapor) for a region around the lidar system 100. The region corresponding to the humidity value may include or may be located near or around the lidar system 100 or near or around the FOR of the lidar system 100. At step 1260, the processor may determine a corrected value of the optical characteristic of the received optical signal, at which point the method may end. The corrected value of the optical characteristic may be determined based at least in part on the electrical signal produced by the receiver, the distance to the target determined by the processor, and the humidity value received by the processor.

Figure 13:
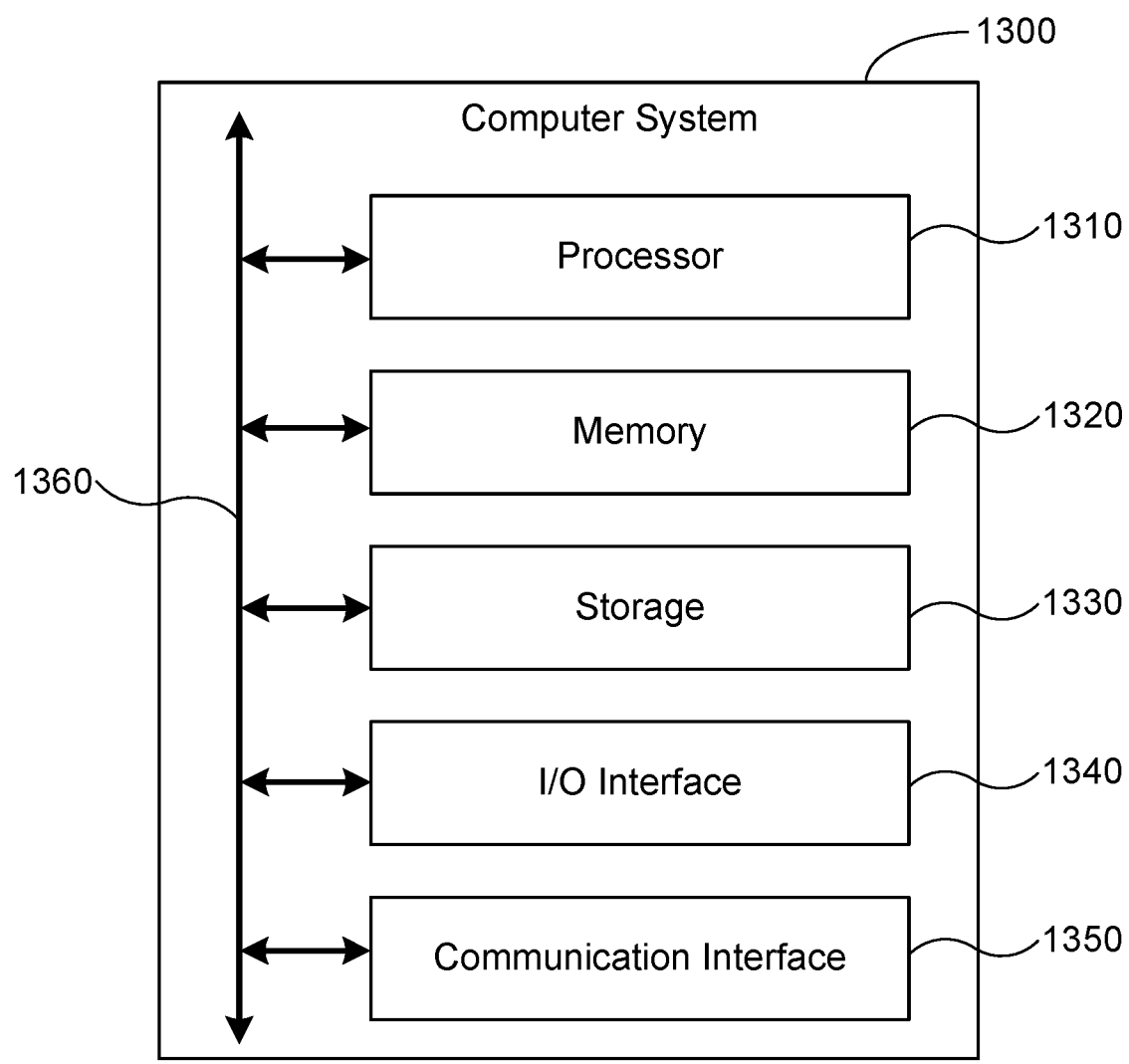
FIG. 13 illustrates an example computer system.

FIG. 13 illustrates an example computer system 1300. In particular embodiments, one or more computer systems 1300 may perform one or more steps of one or more methods described or illustrated herein. In particular embodiments, one or more computer systems 1300 may provide functionality described or illustrated herein. In particular embodiments, software running on one or more computer systems 1300 may perform one or more steps of one or more methods described or illustrated herein or may provide functionality described or illustrated herein. Particular embodiments may include one or more portions of one or more computer systems 1300. In particular embodiments, a computer system may be referred to as a processor, a controller, a computing device, a computing system, a computer, a general-purpose computer, or a data-processing apparatus. Herein, reference to a computer system may encompass one or more computer systems, where appropriate.

Computer system 1300 may take any suitable physical form. As an example, computer system 1300 may be an embedded computer system, a system-on-chip (SOC), a single-board computer system (SBC), a desktop computer system, a laptop or notebook computer system, a mainframe, a mesh of computer systems, a server, a tablet computer system, or any suitable combination of two or more of these. As another example, all or part of computer system 1300 may be combined with, coupled to, or integrated into a variety of devices, including, but not limited to, a camera, camcorder, personal digital assistant (PDA), mobile telephone, smartphone, electronic reading device (e.g., an e-reader), game console, smart watch, clock, calculator, television monitor, flat-panel display, computer monitor, vehicle display (e.g., odometer display or dashboard display), vehicle navigation system, lidar system, ADAS, autonomous vehicle, autonomous-vehicle driving system, cockpit control, camera view display (e.g., display of a rear-view camera in a vehicle), eyewear, or head-mounted display. Where appropriate, computer system 1300 may include one or more computer systems 1300; be unitary or distributed; span multiple locations; span multiple machines; span multiple data centers; or reside in a cloud, which may include one or more cloud components in one or more networks. Where appropriate, one or more computer systems 1300 may perform without substantial spatial or temporal limitation one or more steps of one or more methods described or illustrated herein. As an example, one or more computer systems 1300 may perform in real time or in batch mode one or more steps of one or more methods described or illustrated herein. One or more computer systems 1300 may perform at different times or at different locations one or more steps of one or more methods described or illustrated herein, where appropriate.

As illustrated in the example of FIG. 13, computer system 1300 may include a processor 1310, memory 1320, storage 1330, an input/output (I/O) interface 1340, a communication interface 1350, or a bus 1360. Computer system 1300 may include any suitable number of any suitable components in any suitable arrangement.

In particular embodiments, processor 1310 may include hardware for executing instructions, such as those making up a computer program. As an example, to execute instructions, processor 1310 may retrieve (or fetch) the instructions from an internal register, an internal cache, memory 1320, or storage 1330; decode and execute them; and then write one or more results to an internal register, an internal cache, memory 1320, or storage 1330. In particular embodiments, processor 1310 may include one or more internal caches for data, instructions, or addresses. Processor 1310 may include any suitable number of any suitable internal caches, where appropriate. As an example, processor 1310 may include one or more instruction caches, one or more data caches, or one or more translation lookaside buffers (TLBs). Instructions in the instruction caches may be copies of instructions in memory 1320 or storage 1330, and the instruction caches may speed up retrieval of those instructions by processor 1310. Data in the data caches may be copies of data in memory 1320 or storage 1330 for instructions executing at processor 1310 to operate on; the results of previous instructions executed at processor 1310 for access by subsequent instructions executing at processor 1310 or for writing to memory 1320 or storage 1330; or other suitable data. The data caches may speed up read or write operations by processor 1310. The TLBs may speed up virtual-address translation for processor 1310. In particular embodiments, processor 1310 may include one or more internal registers for data, instructions, or addresses. Processor 1310 may include any suitable number of any suitable internal registers, where appropriate. Where appropriate, processor 1310 may include one or more arithmetic logic units (ALUs); may be a multi-core processor; or may include one or more processors 1310.

In particular embodiments, memory 1320 may include main memory for storing instructions for processor 1310 to execute or data for processor 1310 to operate on. As an example, computer system 1300 may load instructions from storage 1330 or another source (such as, for example, another computer system 1300) to memory 1320. Processor 1310 may then load the instructions from memory 1320 to an internal register or internal cache. To execute the instructions, processor 1310 may retrieve the instructions from the internal register or internal cache and decode them. During or after execution of the instructions, processor 1310 may write one or more results (which may be intermediate or final results) to the internal register or internal cache. Processor 1310 may then write one or more of those results to memory 1320. One or more memory buses (which may each include an address bus and a data bus) may couple processor 1310 to memory 1320. Bus 1360 may include one or more memory buses. In particular embodiments, one or more memory management units (MMUs) may reside between processor 1310 and memory 1320 and facilitate accesses to memory 1320 requested by processor 1310. In particular embodiments, memory 1320 may include random access memory (RAM). This RAM may be volatile memory, where appropriate. Where appropriate, this RAM may be dynamic RAM (DRAM) or static RAM (SRAM). Memory 1320 may include one or more memories 1320, where appropriate.

In particular embodiments, storage 1330 may include mass storage for data or instructions. As an example, storage 1330 may include a hard disk drive (HDD), a floppy disk drive, flash memory, an optical disc, a magneto-optical disc, magnetic tape, or a Universal Serial Bus (USB) drive or a combination of two or more of these. Storage 1330 may include removable or non-removable (or fixed) media, where appropriate. Storage 1330 may be internal or external to computer system 1300, where appropriate. In particular embodiments, storage 1330 may be non-volatile, solid-state memory. In particular embodiments, storage 1330 may include read-only memory (ROM). Where appropriate, this ROM may be mask ROM (MROM), programmable ROM (PROM), erasable PROM (EPROM), electrically erasable PROM (EEPROM), flash memory, or a combination of two or more of these. Storage 1330 may include one or more storage control units facilitating communication between processor 1310 and storage 1330, where appropriate. Where appropriate, storage 1330 may include one or more storages 1330.

In particular embodiments, I/O interface 1340 may include hardware, software, or both, providing one or more interfaces for communication between computer system 1300 and one or more I/O devices. Computer system 1300 may include one or more of these I/O devices, where appropriate. One or more of these I/O devices may enable communication between a person and computer system 1300. As an example, an I/O device may include a keyboard, keypad, microphone, monitor, mouse, printer, scanner, speaker, camera, stylus, tablet, touch screen, trackball, another suitable I/O device, or any suitable combination of two or more of these. An I/O device may include one or more sensors. Where appropriate, I/O interface 1340 may include one or more device or software drivers enabling processor 1310 to drive one or more of these I/O devices. I/O interface 1340 may include one or more I/O interfaces 1340, where appropriate.

In particular embodiments, communication interface 1350 may include hardware, software, or both providing one or more interfaces for communication (such as, for example, packet-based communication) between computer system 1300 and one or more other computer systems 1300 or one or more networks. As an example, communication interface 1350 may include a network interface controller (NIC) or network adapter for communicating with an Ethernet or other wire-based network or a wireless NIC (WNIC); a wireless adapter for communicating with a wireless network, such as a WI-FI network; or an optical transmitter (e.g., a laser or a light-emitting diode) or an optical receiver (e.g., a photodetector) for communicating using fiber-optic communication or free-space optical communication. Computer system 1300 may communicate with an ad hoc network, a personal area network (PAN), an in-vehicle network (IVN), a local area network (LAN), a wide area network (WAN), a metropolitan area network (MAN), or one or more portions of the Internet or a combination of two or more of these. One or more portions of one or more of these networks may be wired or wireless. As an example, computer system 1300 may communicate with a wireless PAN (WPAN) (such as, for example, a BLUETOOTH WPAN), a WI-FI network, a Worldwide Interoperability for Microwave Access (WiMAX) network, a cellular telephone network (such as, for example, a Global System for Mobile Communications (GSM) network), or other suitable wireless network or a combination of two or more of these. As another example, computer system 1300 may communicate using fiber-optic communication based on 100 Gigabit Ethernet (100 GbE), 10 Gigabit Ethernet (10 GbE), or Synchronous Optical Networking (SONET). Computer system 1300 may include any suitable communication interface 1350 for any of these networks, where appropriate. Communication interface 1350 may include one or more communication interfaces 1350, where appropriate.

In particular embodiments, bus 1360 may include hardware, software, or both coupling components of computer system 1300 to each other. As an example, bus 1360 may include an Accelerated Graphics Port (AGP) or other graphics bus, a controller area network (CAN) bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local bus (VLB), or another suitable bus or a combination of two or more of these. Bus 1360 may include one or more buses 1360, where appropriate.

In particular embodiments, various modules, circuits, systems, methods, or algorithm steps described in connection with the implementations disclosed herein may be implemented as electronic hardware, computer software, or any suitable combination of hardware and software. In particular embodiments, computer software (which may be referred to as software, computer-executable code, computer code, a computer program, computer instructions, or instructions) may be used to perform various functions described or illustrated herein, and computer software may be configured to be executed by or to control the operation of computer system 1300. As an example, computer software may include instructions configured to be executed by processor 1310. In particular embodiments, owing to the interchangeability of hardware and software, the various illustrative logical blocks, modules, circuits, or algorithm steps have been described generally in terms of functionality. Whether such functionality is implemented in hardware, software, or a combination of hardware and software may depend upon the particular application or design constraints imposed on the overall system.

In particular embodiments, a computing device may be used to implement various modules, circuits, systems, methods, or algorithm steps disclosed herein. As an example, all or part of a module, circuit, system, method, or algorithm disclosed herein may be implemented or performed by a general-purpose single- or multi-chip processor, a digital signal processor (DSP), an ASIC, a FPGA, any other suitable programmable-logic device, discrete gate or transistor logic, discrete hardware components, or any suitable combination thereof. A general-purpose processor may be a microprocessor, or, any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

In particular embodiments, one or more implementations of the subject matter described herein may be implemented as one or more computer programs (e.g., one or more modules of computer-program instructions encoded or stored on a computer-readable non-transitory storage medium). As an example, the steps of a method or algorithm disclosed herein may be implemented in a processor-executable software module which may reside on a computer-readable non-transitory storage medium. In particular embodiments, a computer-readable non-transitory storage medium may include any suitable storage medium that may be used to store or transfer computer software and that may be accessed by a computer system. Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs (e.g., compact discs (CDs), CD-ROM, digital versatile discs (DVDs), blu-ray discs, or laser discs), optical disc drives (ODDs), magneto-optical discs, magneto-optical drives, floppy diskettes, floppy disk drives (FDDs), magnetic tapes, flash memories, solid-state drives (SSDs), RAM, RAM-drives, ROM, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

In particular embodiments, certain features described herein in the context of separate implementations may also be combined and implemented in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

While operations may be depicted in the drawings as occurring in a particular order, this should not be understood as requiring that such operations be performed in the particular order shown or in sequential order, or that all operations be performed. Further, the drawings may schematically depict one more example processes or methods in the form of a flow diagram or a sequence diagram. However, other operations that are not depicted may be incorporated in the example processes or methods that are schematically illustrated. For example, one or more additional operations may be performed before, after, simultaneously with, or between any of the illustrated operations. Moreover, one or more operations depicted in a diagram may be repeated, where appropriate. Additionally, operations depicted in a diagram may be performed in any suitable order. Furthermore, although particular components, devices, or systems are described herein as carrying out particular operations, any suitable combination of any suitable components, devices, or systems may be used to carry out any suitable operation or combination of operations. In certain circumstances, multitasking or parallel processing operations may be performed. Moreover, the separation of various system components in the implementations described herein should not be understood as requiring such separation in all implementations, and it should be understood that the described program components and systems may be integrated together in a single software product or packaged into multiple software products.

Various embodiments have been described in connection with the accompanying drawings. However, it should be understood that the figures may not necessarily be drawn to scale. As an example, distances or angles depicted in the figures are illustrative and may not necessarily bear an exact relationship to actual dimensions or layout of the devices illustrated.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes or illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend.

The term "or" as used herein is to be interpreted as an inclusive or meaning any one or any combination, unless expressly indicated otherwise or indicated otherwise by context. Therefore, herein, the expression "A or B" means "A, B, or both A and B." As another example, herein, "A, B or C" means at least one of the following: A; B; C; A and B; A and C; B and C; A, B and C. An exception to this definition will occur if a combination of elements, devices, steps, or operations is in some way inherently mutually exclusive.

As used herein, words of approximation such as, without limitation, "approximately, "substantially," or "about" refer to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skill in the art recognize the modified feature as having the required characteristics or capabilities of the unmodified feature. In general, but subject to the preceding discussion, a numerical value herein that is modified by a word of approximation such as "approximately" may vary from the stated value by ±0.5%, ±1%, ±2%, ±3%, ±4%, ±5%, ±10%, ±12%, or ±15%.

As used herein, the terms "first," "second," "third," etc. may be used as labels for nouns that they precede, and these terms may not necessarily imply a particular ordering (e.g., a particular spatial, temporal, or logical ordering). As an example, a system may be described as determining a "first result" and a "second result," and the terms "first" and "second" may not necessarily imply that the first result is determined before the second result.

As used herein, the terms "based on" and "based at least in part on" may be used to describe or present one or more factors that affect a determination, and these terms may not exclude additional factors that may affect a determination. A determination may be based solely on those factors which are presented or may be based at least in part on those factors. The phrase "determine A based on B" indicates that B is a factor that affects the determination of A. In some instances, other factors may also contribute to the determination of A. In other instances, A may be determined based solely on B.

What is claimed is:
1. A lidar system comprising:
  a light source configured to emit an optical signal that is directed into a field of regard (FOR) of the lidar system;
  a receiver configured to:
    receive a portion of the emitted optical signal scattered by a target located in the FOR a distance from the lidar system; and
    produce an electrical signal corresponding to the received optical signal, wherein the electrical signal is related to a preliminary value of an optical characteristic of the received optical signal; and a processor coupled to the receiver and configured to:
  determine the distance to the target based at least in part on a round-trip time for the portion of the emitted optical signal to travel to the target and back to the lidar system;
  receive a humidity value that represents an amount of humidity for a region around the lidar system; and
  determine a corrected value of the optical characteristic of the received optical signal based at least in part on the electrical signal produced by the receiver, the distance to the target, and the humidity value.

2. The lidar system of claim 1, wherein the optical characteristic of the received optical signal corresponds to a peak optical intensity, a peak optical power, an average optical power, or an optical energy of the received optical signal.

3. The lidar system of claim 1, wherein determining the corrected value of the optical characteristic of the received optical signal comprises:
  determining the preliminary value of the optical characteristic of the received optical signal based at least in part on the electrical signal produced by the receiver;
  determining a humidity correction factor (HCF) based at least in part on the distance to the target and the humidity value; and
  applying the humidity correction factor to the preliminary value of the optical characteristic to determine the corrected value of the optical characteristic of the received optical signal.

4. The lidar system of claim 3, wherein the humidity correction factor is related to an amount of optical absorption of the emitted optical signal by water vapor while the emitted optical signal travels to the target and back to the lidar system.

5. The lidar system of claim 3, wherein the humidity correction factor is determined from an expression $HCF=e^{2D\alpha}$, wherein D is the distance to the target and $\alpha$ is an absorption coefficient associated with optical absorption of the emitted optical signal by water vapor in the region around the lidar system.

6. The lidar system of claim 5, wherein the absorption coefficient depends on a concentration of water vapor in the region around the lidar system and a wavelength of the emitted optical signal.

7. The lidar system of claim 3, wherein the corrected value of the optical characteristic of the received optical signal is determined from an expression OC=HCF×OC', wherein:
  HCF is the humidity correction factor;
  OC' is the preliminary value of the optical characteristic of the received optical signal; and
  OC is the corrected value of the optical characteristic of the received optical signal.

8. The lidar system of claim 1, wherein the corrected value of the optical characteristic of the received optical signal corresponds to a zero-humidity value of the optical characteristic.

9. The lidar system of claim 1, wherein the humidity value corresponds to a concentration of water vapor in the region around the lidar system.

10. The lidar system of claim 1, wherein the lidar system further comprises a humidity sensor located within, on, or near the lidar system, wherein the humidity sensor is configured to provide the humidity value to the processor.

11. The lidar system of claim 1, wherein:
  the lidar system is located within or on a vehicle; and
  the vehicle comprises a humidity sensor located within or on the vehicle, wherein the humidity sensor is configured to provide the humidity value to the processor.

12. The lidar system of claim 1, wherein the lidar system further comprises a wireless receiver configured to:
  receive the humidity value from a remotely located weather information service; and
  provide the humidity value to the processor.

13. The lidar system of claim 1, wherein the lidar system is located within or on a vehicle, the vehicle comprising a wireless receiver configured to:
  receive the humidity value from a remotely located weather information service; and
  provide the humidity value to the processor.

14. The lidar system of claim 1, wherein the processor is further configured to determine a reflectivity value for the target based at least in part on:
  the distance to the target; and
  the corrected value of the optical characteristic of the received optical signal.

15. The lidar system of claim 14, wherein the reflectivity value for the target is further based at least in part on a value of a corresponding optical characteristic of the emitted optical signal.

16. The lidar system of claim 1, wherein the electrical signal produced by the receiver is a digital signal comprising one or more values that correspond to the received optical signal.

17. The lidar system of claim 1, wherein the receiver comprises an avalanche photodiode or a PIN photodiode.

18. The lidar system of claim 1, wherein the light source is configured to emit pulses of light having:
  one or more wavelengths between 900 nm and 1700 nm;
  a pulse energy between 0.1 µJ and 100 µJ;
  a pulse repetition frequency between 80 kHz and 10 MHz; and
  a pulse duration between 0.1 ns and 20 ns.

19. The lidar system of claim 1, wherein the lidar system is a pulsed lidar system wherein:
  the emitted optical signal comprises a pulse of light;
  the received optical signal comprises a portion of the emitted pulse of light; and
  the receiver comprises:
    a detector configured to generate a pulse of electrical current corresponding to the received pulse of light; and
    a pulse-detection circuit configured to receive the electrical-current pulse and produce the electrical signal corresponding to the received pulse of light.

20. The lidar system of claim 19, wherein the pulse-detection circuit comprises:
  an electronic amplifier configured to produce a voltage pulse that corresponds to the electrical-current pulse; and
  one or more threshold detectors, each threshold detector comprising:
    a comparator configured to produce an edge signal when the voltage pulse exceeds a particular threshold voltage; and
    a time-to-digital converter configured to determine a time associated with the edge signal, wherein the electrical signal corresponding to the received pulse of light comprises a digital value corresponding to the determined time.

21. The lidar system of claim 19, wherein the pulse-detection circuit comprises an analog-to-digital converter configured to generate the electrical signal, wherein the electrical signal comprises a series of values that correspond to a shape or amplitude of the received pulse of light.

22. The lidar system of claim 1, wherein:
the lidar system is a frequency-modulated continuous-wave (FMCW) lidar system wherein the emitted optical signal comprises frequency-modulated light; and
the receiver is configured to determine a frequency difference between the emitted optical signal and the received optical signal.

23. The lidar system of claim 1, wherein the emitted optical signal is one of a plurality of optical signals emitted by the light source, and the lidar system further comprises a scanner configured to scan at least a portion of the emitted optical signals across the field of regard of the lidar system.

24. The lidar system of claim 23, wherein the scanner comprises one or more scan mirrors, wherein each scan mirror is mechanically driven by a galvanometer scanner, a synchronous electric motor, a microelectromechanical systems (MEMS) device, a resonant scanner, or a voice coil motor.

25. The lidar system of claim 23, wherein the scanner comprises:
a scanning mirror configured to scan the emitted light along a first direction; and
a polygon mirror configured to scan the emitted light along a second direction substantially orthogonal to the first direction.

26. The lidar system of claim 23, wherein the scanner comprises a solid-state scanning device comprising one or more of the following:
an optical phased array scanning device;
a liquid-crystal scanning device; or
a liquid lens scanning device.

27. The lidar system of claim 1, wherein the light source comprises a direct-emitter laser diode configured to emit the optical signal.

28. The lidar system of claim 1, wherein the light source comprises a seed laser diode configured to produce a seed optical signal and an optical amplifier configured to amplify the seed optical signal to produce the emitted optical signal.

29. The lidar system of claim 1, wherein the light source comprises a Q-switched diode-pumped solid-state (DPSS) laser configured to emit a series of pulses of light, the DPSS laser comprising:

a gain medium;
one or more pump laser diodes configured to optically pump the gain medium; and
a passive or active Q-switch.

30. The lidar system of claim 1, wherein the lidar system is part of a vehicle comprising an advanced driver assistance system (ADAS) configured to assist a driver of the vehicle in operating the vehicle, wherein the lidar system is configured to provide information about a surrounding environment of the vehicle to the ADAS.

31. The lidar system of claim 1, wherein the lidar system is part of an autonomous vehicle comprising an autonomous-vehicle driving system configured to guide the autonomous vehicle through a surrounding environment toward a destination, wherein the lidar system is configured to provide information about the surrounding environment to the autonomous-vehicle driving system.

32. A method comprising:
emitting, by a light source of a lidar system, an optical signal that is directed into a field of regard (FOR) of the lidar system;
receiving, by a receiver of the lidar system, a portion of the emitted optical signal scattered by a target located a distance from the lidar system;
producing, by the receiver, an electrical signal corresponding to the received optical signal, wherein the electrical signal is related to a preliminary value of an optical characteristic of the received optical signal;
determining, by a processor of the lidar system, the distance to the target based at least in part on a round-trip time for the portion of the emitted optical signal to travel to the target and back to the lidar system;
receiving, by the processor, a humidity value that represents an amount of humidity for a region around the lidar system; and
determining, by the processor, a corrected value of the optical characteristic of the received optical signal based at least in part on the electrical signal produced by the receiver, the distance to the target, and the humidity value.

* * * * *